United States Patent
Mathis

(10) Patent No.: US 7,155,590 B2
(45) Date of Patent: Dec. 26, 2006

(54) METHOD AND APPARATUS FOR COMPUTER MEMORY PROTECTION AND VERIFICATION

(76) Inventor: Richard M. Mathis, 9773 Lost Colt Cir., Las Vegas, NV (US) 89117

( * ) Notice: Subject to any disclaimer, the term of this patent is extended or adjusted under 35 U.S.C. 154(b) by 1017 days.

(21) Appl. No.: 09/827,008

(22) Filed: Apr. 5, 2001

(65) Prior Publication Data

US 2001/0037438 A1 Nov. 1, 2001

(51) Int. Cl.
*G06F 12/14* (2006.01)
(52) U.S. Cl. .......................... 711/164; 714/45; 463/29; 902/23; 711/103; 711/115
(58) Field of Classification Search ............... 711/163, 711/115, 103; 714/45; 463/29; 902/23
See application file for complete search history.

(56) References Cited

U.S. PATENT DOCUMENTS

| | | | | |
|---|---|---|---|---|
| 3,573,855 A | * | 4/1971 | Cragon et al. | 711/163 |
| 3,827,029 A | * | 7/1974 | Schlotterer et al. | 711/163 |
| 4,727,544 A | * | 2/1988 | Brunner et al. | 463/29 |
| 5,319,765 A | | 6/1994 | Kimura | |
| 5,442,704 A | | 8/1995 | Holtey | |
| 5,729,212 A | * | 3/1998 | Martin | 340/870.28 |
| 5,778,070 A | * | 7/1998 | Mattison | 713/191 |
| 5,885,158 A | | 3/1999 | Torango et al. | |
| 6,009,524 A | * | 12/1999 | Olarig et al. | 713/200 |
| 6,035,368 A | * | 3/2000 | Habib | 711/103 |
| 6,732,274 B1 | * | 5/2004 | Charron | 713/193 |

* cited by examiner

*Primary Examiner*—Pierre Bataille
*Assistant Examiner*—Sheng-Jen Tsai
(74) *Attorney, Agent, or Firm*—John W. Carpenter; Reed Smith, LLP

(57) ABSTRACT

A method and apparatus are provided for computer memory protection and verification. In one example, the apparatus is a secure memory device (SMD) including means to independently read the program memory device and compute and store a signature or other means of verification of binary content of the program memory device, means to compare binary program memory content to binary program memory content stored in the program memory device, and means to disable reading and writing of the program memory device if predetermined conditions do not occur. A previously stored signature of program memory content may be used as means of verification of previous program memory content. A secure memory device may be constructed as a single securely enclosed unit that is tamperproof and that has electrical connections available only for purpose of connection with an apparatus that accepts a program memory.

25 Claims, 21 Drawing Sheets

Contact representation in state to read program memory data for signature

Contact representation in state to read program memory by external microcontroller

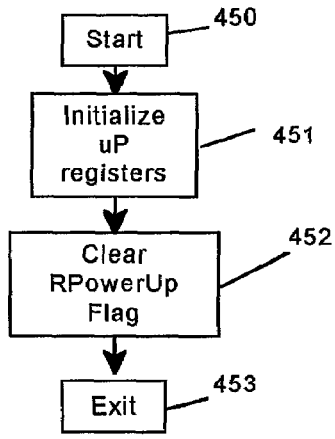
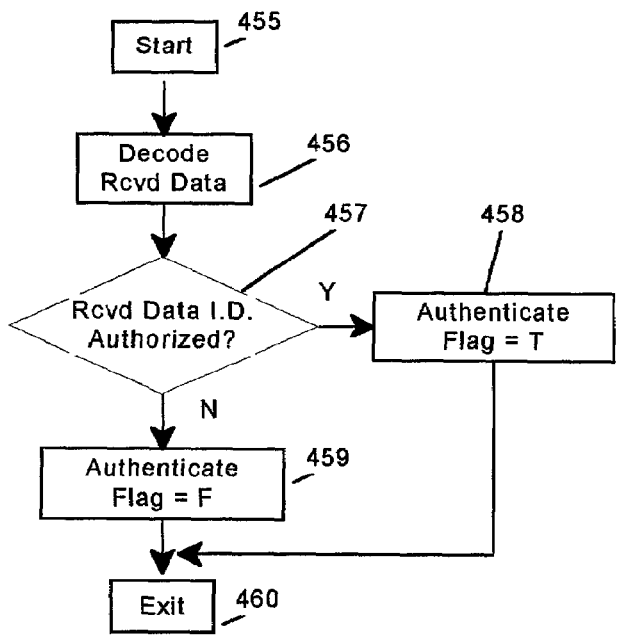
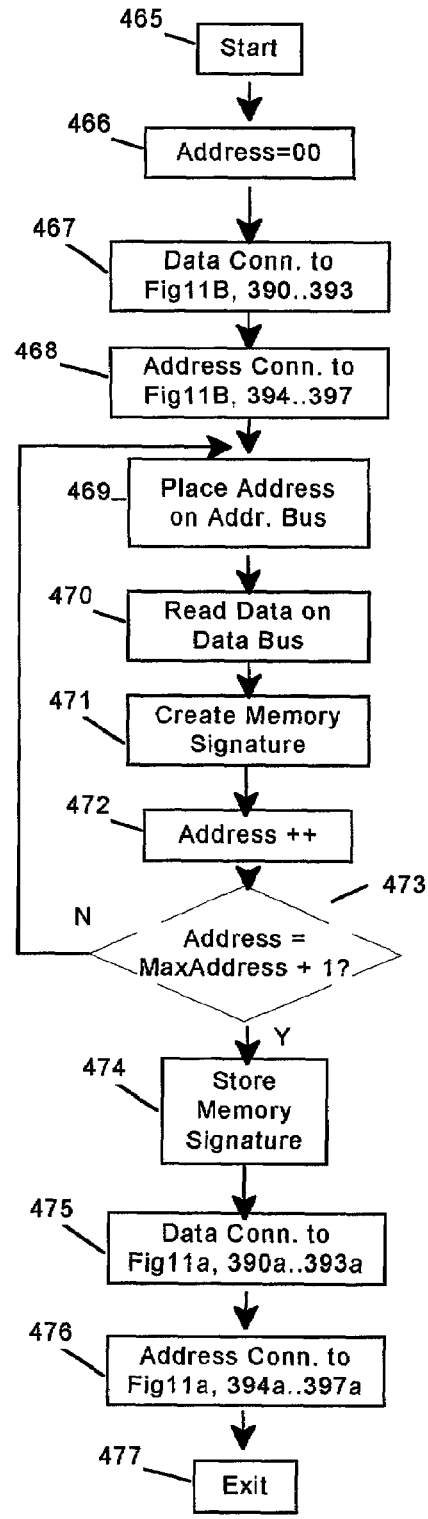

METHOD AND APPARATUS FOR COMPUTER MEMORY PROTECTION AND VERIFICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to consumer interactive devices such as gaming machines and, more particularly, to ways of protecting these consumer interactive devices from tampering.

2. Discussion of Background

The operation of many consumer interactive devices, such as gaming machines, is by means of a program running upon a microcomputer. A program memory is typically an electronic device that contains a set of instructions by means of which a microcomputer plays and presents a game. The program memory is generally a semiconductor device, but may be a rotating storage apparatus, such as a magnetic hard disk. Common program memory is a read-only device, which in many cases is an erasable programmable read-only memory (EPROM). Generally and typically, a program memory is a member of a set of devices known as electronic memory and is designed to be accessed by means of a standard memory bus configuration which may include a chip enable input signal, a data output enable input signal, a data bus, and address bus and, in some cases, a write enable input signal. An EPROM may be erased by application of a manufacturer specified set of conditions and may be programmed to contain a set of instructions in binary format by means of a manufacturer specified device (EPROM programmer) commonly available. Generally, EPROMs available from different manufacturers may be easily programmed by a person possessing minimum technical skills. A copy of EPROM contents is very easily made and the copy may serve as a basis for an unscrupulous individual to construct a set of program instructions that cheat a player or an operator of a consumer interactive device, such as gaming device.

Various numeric algorithms that produce a set of numeric results exist and are employed to assure that contents of program memory have not been altered from contents originally programmed. The algorithms perform a mathematical operation by means of reading the binary contents of a program memory and performing a mathematical operation that combines binary values into a compact result commonly termed a signature. These algorithms check the memory content, but generally require that a skilled person perform manual verification of the memory content by means of physically removing the program memory from an apparatus, placing the program memory into an apparatus which can read binary content of program memory and generating a signature of the memory contents in accordance with a predetermined mathematical algorithm. Certain well-known methods of obtaining a memory check signature such as checksum or cyclic redundancy check are easily defeated. More secure and less easily defeated methods of generating a signature of program memory exist, but are not employed by all manufacturers.

Unscrupulous individuals may attempt to cheat operators of games by means of modifying the contents of a game program memory to attain a predetermined result. Players of games may also be cheated by unscrupulous operators employing the same means. Large amounts of money are lost each year by game operators and players alike to cheating by means of inserting EPROM's containing program memory modified to produce a dishonest result. Many thousands of gaming devices are installed world wide and verification of program memory contents is difficult; since to do so requires that game program memory be physically removed and manually verified. Additionally some regulatory bodies regularly require verification of gaming machine program memory in accordance with a specified time schedule. The scheduled verification can be difficult and costly if performed by the currently available manual means.

A market exists for previously used gaming machines, but various gaming devices not permitted in certain jurisdictions. The fact that they are not permitted does not, however, prevent them being imported and placed into use. Current methods of curtailing use of unauthorized devices are primarily regulatory in nature and require great amounts of manpower to implement. There is no simple method of disabling a consumer interactive device, such as a gaming machine, for regulatory purposes other than removing program memory or the main controller printed circuit board.

Accordingly, it is of great concern to manufacturers and operators of gaming machines and computer-controlled devices in general, that unauthorized reading of the contents of a program memory may be performed. The reading may allow copies of program memory to be made and not paid for, be for purposes of reverse engineering of a program, be used as a basis for creating a program memory with unauthorized features to cheat an operator or user or for various other reasons. Program memories in common use are generic devices that allow interface to computer or microcomputer electrical interconnections in a very simple and well-defined manner. Specifically, the electrical connections are made to a computer or microcomputer data bus, address bus. Provision is made for application of a signal to generally enable memory (chip enable) and to cause binary data to be output upon a data bus (output enable or read enable). Since program memory devices are so simple and made to a generic interface standard, the process of reading the contents of a memory device is easily accomplished. From the standpoint of the program memory device, there is no difference if reading is by means of an attached computer which depends upon the device for its program instruction or if reading is by means of a device which stores binary content of the program memory device for later analysis, modification or to allow production of a copy of the binary program contents.

Additionally, there is a complication in that program memory devices are typically required to be comprised of materials that allow electrical signals of very short duration to be recognized and interpreted. The requirement for recognition of short duration electrical signals corresponds directly to speed of operation of a computer device and precludes on-the-fly decoding schemes that require significant time to accomplish. Decoding and downloading program memory to random access memory (RAM) is also not an acceptable solution in certain operational environments due to ease with which RAM contents may be corrupted.

Methods of encoding program memory content with subsequent on-the-fly decoding of program memory content by attached computers running a program contained within the program memory do exist. Generally, specialized hardware will be required to protect program memory in a circuit board designed. To use a generic program memory will require at least complete re-design of an existing circuit board and redesign of an existing method of writing program memory into a program memory device.

SUMMARY OF THE INVENTION

It has been recognized that what is needed is reliable means for protecting against the tampering of program memory in consumer interactive devices. Broadly speaking, the present invention fills this need by providing a method and apparatus for computer memory protection and verification. It should be appreciated that the present invention can be implemented in numerous ways, including as a process, an apparatus, a system, a device or a method. Several inventive embodiments of the present invention are described below.

The present invention provides a simple means of protecting contents of a program memory from unauthorized reading. A system is provided that comprises a program memory device used to store a binary image of program memory that may be inserted onto a data bus of a microcomputer controlled apparatus. The purpose of the program memory device is to allow execution of a predetermined sequence of microcomputer instructions, in other words, a program, and a device which may be fixed to an enclosure housing the microcomputer apparatus. The device fixed to the enclosure housing the microcomputer apparatus comprises means for communication with the program memory device, storage of means of identification of a predetermined binary image in the program memory device, and means of indication to an operator as to whether binary image contained in the memory device complies with a predetermined binary image. Components of the system are further described below.

A secure memory device (SMD) is provided that comprises means to independently read the program memory device and compute and store a signature or other means of verification of binary content of the program memory device, means to compare binary program memory content to binary program memory content stored in the program memory device, and means to disable reading and writing of the program memory device if predetermined conditions do not occur. A binary bit-for-bit copy of program memory content may be used as means of verification of previous program memory content. A secure memory device may be constructed as a single securely enclosed unit that is tamperproof and that has electrical connections available only for purpose of connection with an apparatus that accepts a program memory.

A secure memory socket (SMS) is also provided that comprises means for placing a program memory device (or program memory chip) in contact with electrical circuit connections of a microcomputer, means to read the program memory chip inserted into the socket, means to compute a verification of binary content of the program memory chip inserted into the socket, means to store a verification value (signature) corresponding to a predetermined expected value of binary content of program memory, and means to disable reading of a program memory chip inserted into the program memory device socket by an attached microcomputer. Disabling reading of a program memory chip by an attached microcomputer prevents running of a program contained within the program memory chip and disables operation of an apparatus that includes the microcomputer. For ease of referral, a device comprising characteristics of a nature described in this paragraph will be referred to as a secure memory socket or by acronym SMS. A secure memory socket may be constructed as a single securely enclosed unit that is tamperproof and that has electrical connections available only for purpose of connection with an apparatus that accepts a program memory and with electrical connections provided for electrical connection with an external program memory.

By means of using a secure memory device as program memory and mating the secure program memory device with a secure memory socket, a means of protection of program memory content from reading except by an authorized computer or microcomputer may be accomplished. Proper circuit board design and proper electrical and mechanical attachment of the secure memory socket to the circuit board can make unauthorized readout of program memory a very difficult task. If the contents of a program memory is read, the program is duplicated and is placed into a circuit board that includes a secure memory socket as a means of accessing program memory, the secure memory socket can be programmed to disable access to unauthorized program memory.

A remote monitor unit (RMU) is provided that is fixed to an enclosure housing a microcomputer controlled apparatus comprising means to communicate with aforesaid program memory device or with aforesaid secure memory socket, means to store an image or signature of an image of binary content of program memory, means by which to compare program memory content stored in the program memory device to a previously determined value, means by which to signal the program memory device or secure memory socket to disable reading of the binary contents of the program memory device by any microcomputer external to the program memory device, and means to signal an operator of status of the program memory device.

A remote access device (RAD) is provided that comprises means to communicate with a secure memory device, secure memory socket or remote monitor unit. Communication with the devices is bi-directional and may include methods of gathering memory signatures from these devices, commanding a device to disable access of program memory contents by an external microcomputer dependent upon the program memory contents for its operation, commanding a device to store a new comparative signature for verification of program memory contents, or additional commands as may be deemed necessary and useful for operation.

Benefits of the system previously described may be realized in a totally different manner by architectural design of a microcomputer-controlled apparatus in which functions are separated and designed into component parts. All component parts communicate with each other and with a central controller. If program memory is altered within the central controller, the microcomputer-controlled apparatus may be rendered nonfunctional by means of component parts declaring themselves nonfunctional until predetermined authorization codes are transmitted to the component parts. The approach described in this paragraph is a distributed system design and operates extremely well. The system described in the paragraphs preceding this one can be retrofitted into existing systems very easily and economically.

Advantages of the present invention include the following: provide independent means of verification of microcomputer program memory content by other than manual means; restrict microcomputer access to program memory content that has been determined to be incorrect and to prevent operation of an apparatus containing the incorrect program memory; provide means of detection of replacement of an entire microcomputer assembly in an apparatus and means of determining if program memory in a replaced assembly contains identical content to program memory in a microcomputer assembly previously installed in the apparatus; provide means to restrict programming of program memory devices to authorized personnel; provide automatic means of alerting personnel who operate and regulate gaming machines that improper program memory is resident upon a gaming machine microcomputer platform; and provide simple means for regulatory personnel to disable a gaming machine from play and to also provide simple means of enabling a gaming machine to be put into operation.

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 15 is a flowchart representation of a program routine, which is accessed by operation flow shown in FIG. 7, in accordance with one embodiment of the present invention.

FIG. 17 is a flowchart representation of a program routine, which is accessed by operation flow shown in FIG. 8, in accordance with one embodiment of the present invention.

FIG. 18 is a flowchart representation of a program routine, which is accessed by operation flow shown in FIG. 8, in accordance with one embodiment of the present invention.

DESCRIPTION OF THE PREFERRED EMBODIMENTS

An invention is provided for a method and apparatus for computer memory protection and verification. Numerous specific details are set forth in order to provide a thorough understanding of the present invention. It will be understood, however, to one skilled in the art, that the present invention may be practiced without some or all of these specific details.

Figure 1:
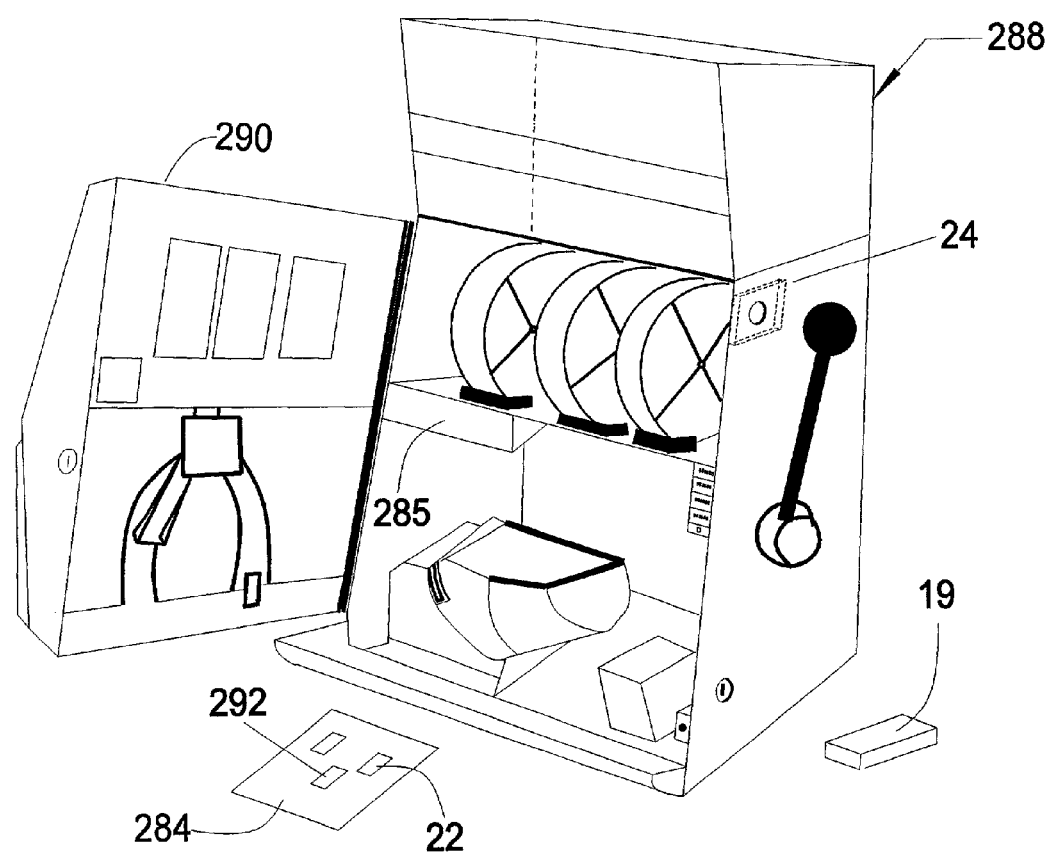
FIG. 1 is a perspective view of the present invention installed in an enclosure of a gaming apparatus, in accordance with one embodiment of the present invention.

FIG. 1 shows a perspective view of the present invention installed in an enclosure of a gaming apparatus 288, in accordance with one embodiment of the present invention. It is important to note that the present invention is not limited to this embodiment, which includes a gaming apparatus. Other embodiments may include, for example, an automatic teller machine (ATM), a vending machine, a general purpose computer, or a special purpose computer, but the present invention is again not so limited. It should be appreciated that a gaming apparatus is used here for exemplary purposes, and provides merely one example of how the present invention may be implemented.

Said gaming apparatus is normally secured by means of a locked door 290 to protect contents of gaming apparatus controller 284 which is enclosed in housing 285 when in operation. A secure memory device 22 is inserted into gaming apparatus control board 284 in such manner as to present a binary program image contained in a program memory device to a microcomputer 292 which is a part of the gaming apparatus control board and by means of which a game may be caused to be presented to a player. A remote monitor device 24 is fixed to said gaming machine enclosure and comprises means to communicate with secure memory device 22; store results of communications with the secure memory device and communicate status of the program memory device to an operator or attendant.

Generally and typically, a memory device comprises means for selecting a memory location, address bus means for reading and writing data to a selected memory location, data bus means for enabling reading of data contained within a memory location, output enable /OE means for enabling writing of data to a memory location, write enable /WE means for enabling an entire program memory device, and chip enable /CE means. Chip enable must be presented with an electrical signal which causes access to be granted to a secure memory device or data cannot be read from or programmed into said memory device. Typically memory is accessed in a sequence in which chip enable is presented an electrical signal of a polarity to cause access to internal memory structure, a pattern of electrical signals uniquely representative of a predetermined address location within memory is placed upon said address bus, an electrical signal is presented to output enable to cause an electrical path to be enabled between said predetermined address location within memory and said data bus, a pattern of electrical signals representative of a binary word stored at the predetermined address location selected occurs upon the data bus.

A microcomputer or any device capable of responding to signals contained within a program memory device performs action in accordance with data contained within program memory and may perform a predetermined action upon reading binary data from the data bus.

Writing data into a program memory device typically is accomplished in a sequence in which chip enable is presented an electrical signal of a polarity to cause access to internal memory structure, a pattern of electrical signals uniquely representative of a predetermined address location within program memory is placed upon the address bus, an electrical signal is presented to write enable to cause an electrical path to be enabled between the predetermined address location within program memory and the data bus and to cause data presented by means of the data bus to be stored within a selected program memory location. Generally a program memory device must contain data of a specified value in locations that are to be written with data in a programming procedure. A program memory device is assured to be a blank device and to contain no data by erasure by means specified by a manufacturer of a device.

Figure 2:
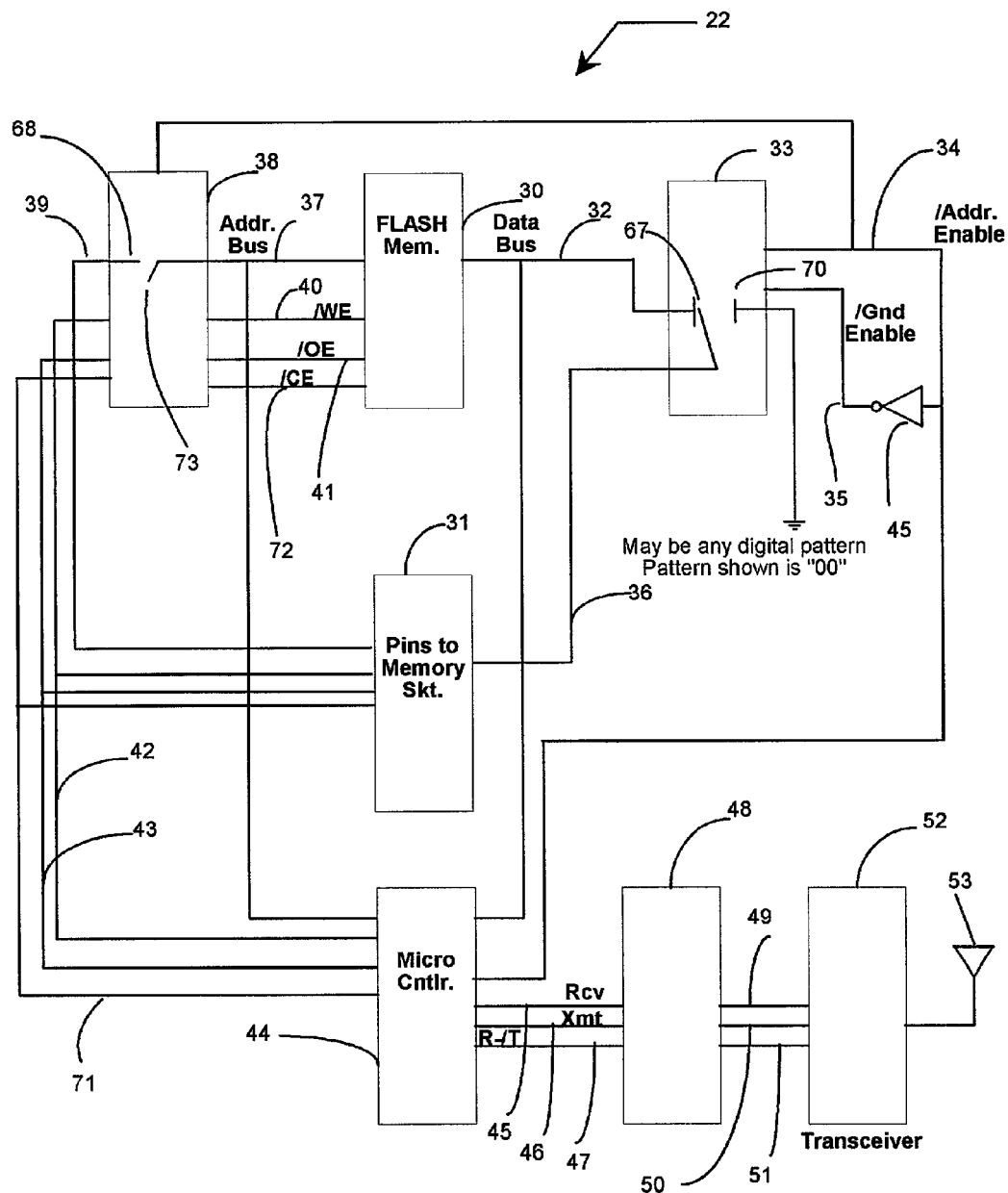
FIG. 2 is a block diagram of a secure memory device, in accordance with one embodiment of the present invention.

FIG. 2 is a block diagram representation of a secure memory device 22 of the present invention, in accordance with one embodiment of the present invention. A means of storing a binary image of program memory is provided by electrically accessible memory 30 (e.g., flash memory). The program memory is connected by means of electrically controlled paths 38 and 33 to a group of electrically conductive pins 31 by means of which the memory communicates with a microcomputer or control device 292 in a gaming apparatus control board 284. Signals upon address bus 37 may be controlled by microcontroller 44 acting upon control path 38. Electrical signals placed on address bus 37 may connect directly to an external address bus 39 connected to the electrically conductive pins 31 or same electrical signals may be switched to connect to a different location depending upon logic state of 38; if said address bus 37 is connected to address bus 39 by means of 38 in position indicated by 68, electrical signals may be sent to program memory device 30 by means of memory socket 31; if 38 is in position indicated by 73, address bus access through 31 and to program memory 30 is denied. Connection to 31 is generally program memory connection to a microcontroller 292 on a gaming apparatus control board. Microcontroller 44 controls logic to switch electrical paths 33 and 38 and can prevent access of program memory by microcontroller 292 thereby disabling said gaming apparatus control board. Typically, if program data presented to microcontroller 292 is allowed to change randomly as may occur if data bus 36 is unconnected, the gaming apparatus control board may behave erratically with potentially disastrous results. Path control device 33 is controlled in a manner by 44, by means of inverter 45 through electrically conductive path 35, to switch to position 70 which connects electrically conductive data bus path 36 to a predetermined data pattern so as to present a predetermined value to microcontroller 292 when program memory data is not accessible due to logic state of 33; the result of which is to cause microcontroller 292 to remain in a predetermined state. Microcontroller 44 may read all program memory contents of program memory 30 and perform predetermined tests to determine program memory validity when electrically controlled switch 33 is in position 70 and simultaneously electrically controlled switch 38 is in position 73; when said electrically controlled switches are in positions described, access to program memory by microcontroller 292 is prohibited and apparatus controlled by said microcontroller is inoperable. Microcontroller 44 may allow apparatus to operate in a normal manner by control of 33 and 38 in such manner as to cause address bus to be switched to position indicated by 68 and data bus to be switched to position indicated by 67. Microcontroller 44 may communicate with a remote monitor unit or remote access device by means of electrically conductive paths 45, 46, and 47 which are connected in turn to electrically conductive paths 49, 50, and 51 by means of electrical voltage level translator 48 and finally connect to electrically controlled transceiver 52. Said transceiver may connect to antenna 53, which provides a communication interface.

Programming of program memory 30 requires that electrical signals of a particular level and time duration be placed upon electrically conductive paths 40, 41 and 72. Said signals are commonly known as write enable, /WE, output enable, /OE, and chip enable, /CE. Microcontroller 44 may monitor said electrically conductive paths by means of electrically conductive paths 42, 43, and 71 and, based upon predetermined patterns, cause access to be denied to program memory as previously described. By denial of access to program memory for programming, a method of preventing unauthorized programming of a device is implemented.

A secure memory socket may be constructed by replacing electrically accessible program memory 30 shown is FIG.2 with an integrated circuit socket capable of accepting a program memory device. Data bus 32, address bus 37, write enable 40, output enable 41, and chip enable 36 signals connect to corresponding pins on said integrated circuit socket as specified by a device manufacturer. Operation of said secure memory socket corresponds to operation of a secure memory device as shown above, but program memory can be inserted and removed from the integrated circuit socket and program memory can be any operator provided program memory device that corresponds to electrical pinout as fixed by the integrated circuit socket. A major difference of the two devices just described is that a secure memory device includes program memory as a part of the device and said program memory is securely fixed within and is a part of said device; it is designed as a replaceable memory component that can be inserted into a circuit board. A secure memory socket is constructed so as to allow a compatible program memory device to be inserted into said secure program memory socket and does not include a program memory device as a component; the secure memory socket is designed as a component to be firmly fixed in electrical contact with a circuit board and into which a program memory may be inserted.

Figure 3:
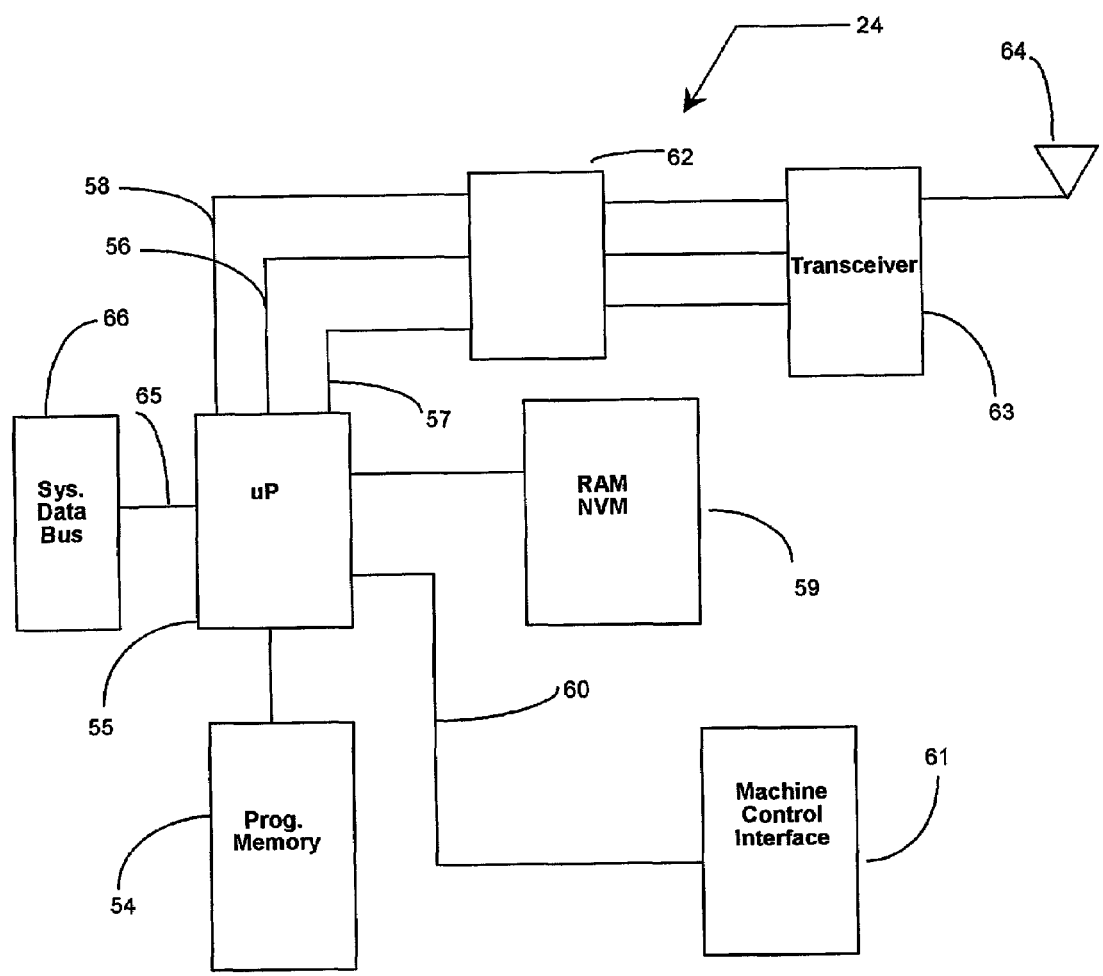
FIG. 3 is a block diagram of a remote monitor unit which communicates with a program memory device, in accordance with one embodiment of the present invention.

FIG. 3 is a block diagram representation of a device fixed to an enclosure of a gaming apparatus, in accordance with one embodiment of the present invention. The purpose of the device is to communicate status of program memory and to communicate status of change of program memory such as may occur with substitution of an entire game control board 284, in accordance with one embodiment of the present invention. Remote monitor unit 24 may be comprised of a microprocessor 55 running a program contained within program memory 54 with access to nonvolatile read-write memory; RAM 59. Said remote monitor unit may communicate with secure memory device 22 or secure memory socket by means of communication device 63 and may also communicate with an attendant by means of said communication device. Additionally communication may occur with a host system by means of system data bus 66 and data path 65.

Figure 4:
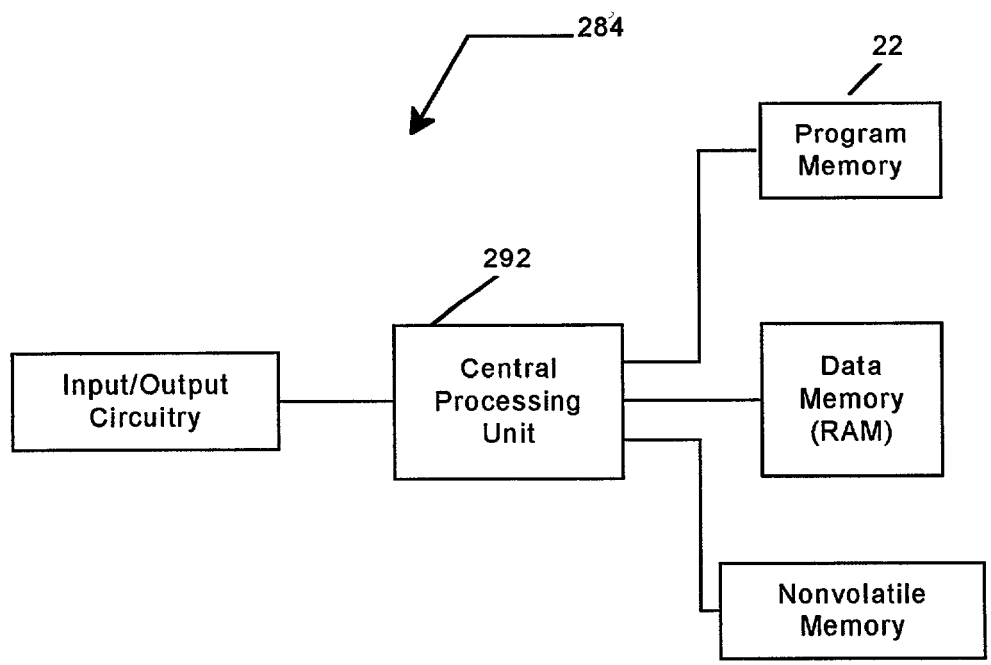
FIG. 4 is a block diagram of a gaming apparatus controller, in accordance with one embodiment of the present invention.

FIG. 4 is a block diagram of a gaming apparatus controller 284, in accordance with one embodiment of the present invention. The gaming apparatus controller 284 may be central processing unit 292, which may be a microprocessor or microcontroller and generally and typically runs a program that is contained within program memory 30. Said program memory may commonly be of a semiconductor construction or a rotating storage device, but may be any device capable of being accessed for program instructions by said central processing unit.

Figure 5A:
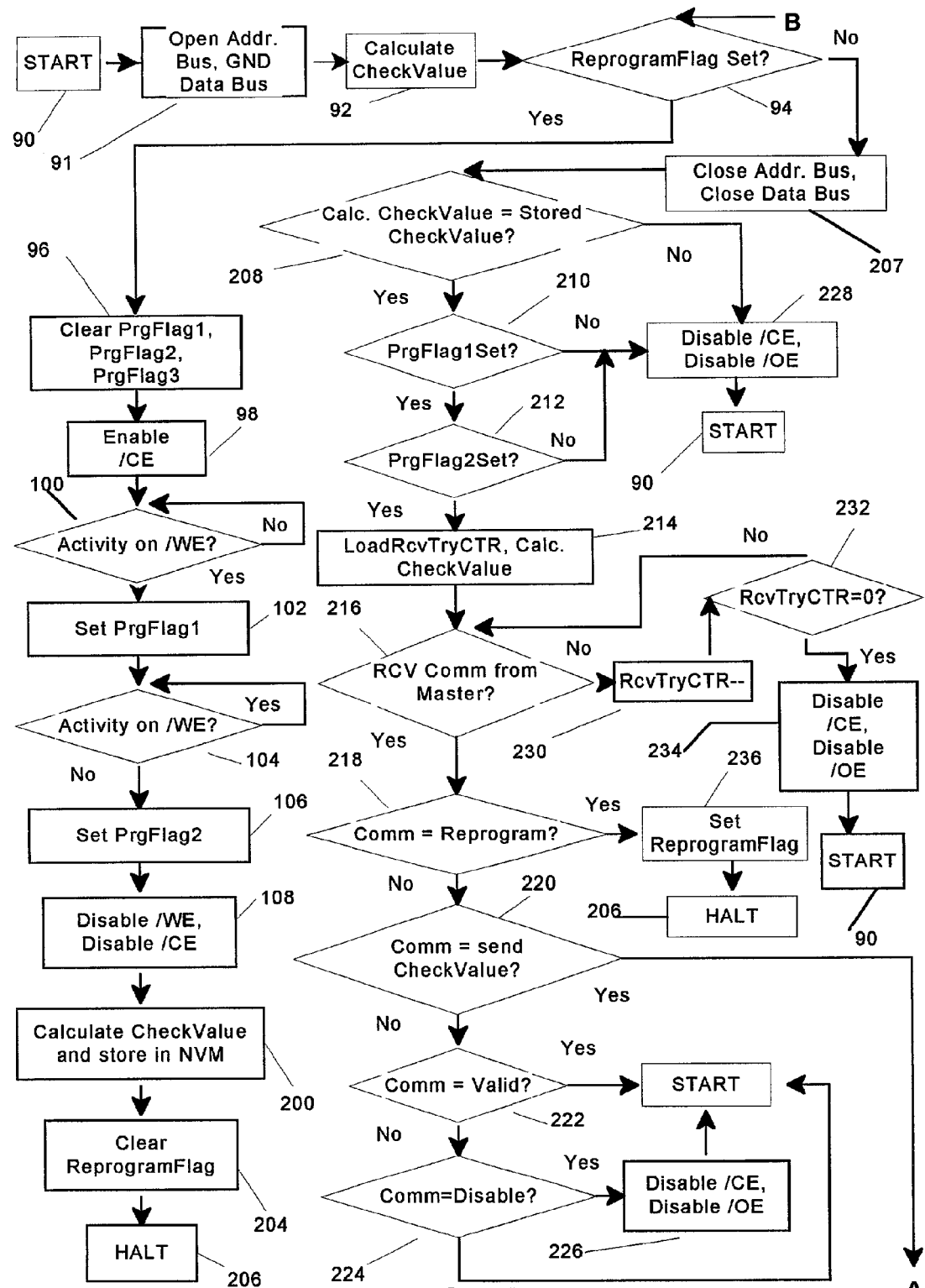
FIG. 5A is a flowchart representation of operation of a secure program memory, in accordance with one embodiment of the present invention.
Figure 5B:
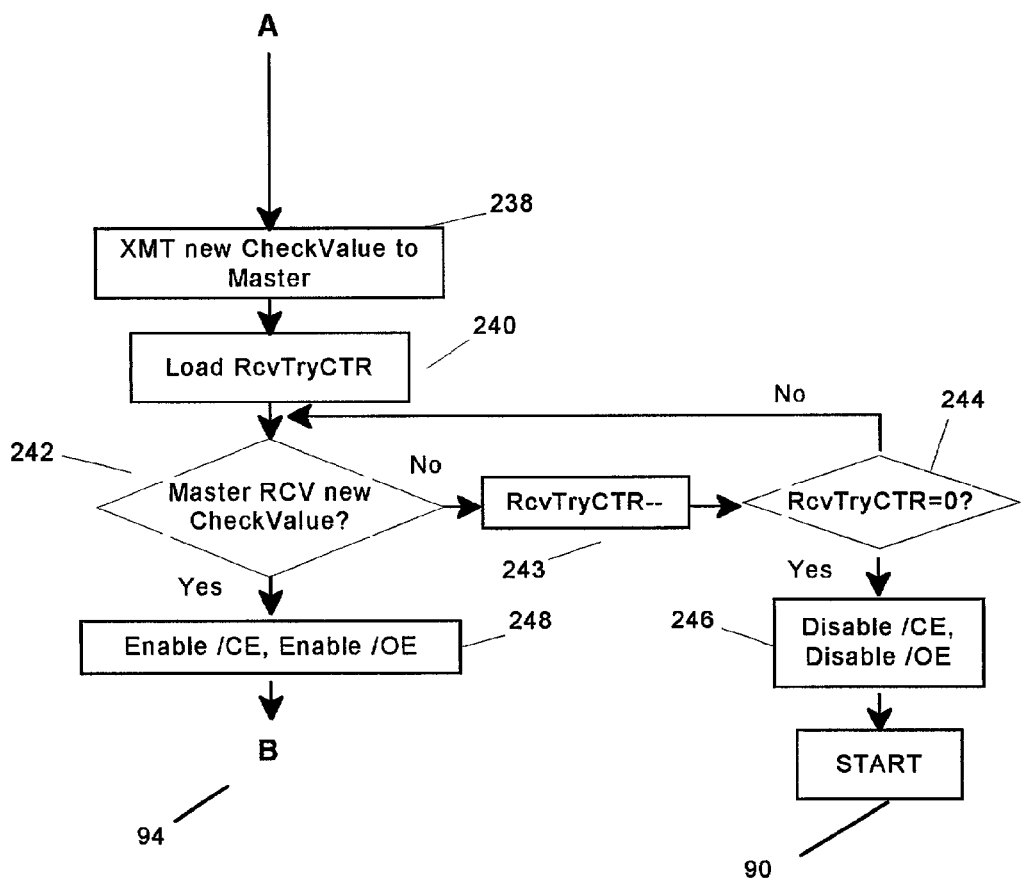
FIG. 5B is a continuation of the flowchart of FIG. 5A, in accordance with one embodiment of the present invention.

FIG. 5A and FIG. 5B, collectively, are a flowchart representation of operation of a secure memory device 22 previously described, in accordance with one embodiment of the present invention. Operation of a program running in microcontroller 44 of said device initializes and begins at 90. Address bus 39 to gaming apparatus controller CPU 292 is disconnected by means of microcontroller 44 applying a signal to a switch 38; data bus 36 to CPU 292 is connected to electrical ground potential by means of a signal applied to switch 33 by microcontroller 44. A block labeled 91 in FIG. 5 shows this. A check value of contents of program memory 30 is calculated by means of microcontroller 44 employing a predetermined algorithm. Said predetermined algorithm may be any well known algorithm designed to check a set of binary values. Generally the algorithm will yield a small set of values that is repeatable and will yield identical results if said set of binary values is not changed. A flag to check if programming of memory is allowed is examined at 94 and if programming is to be allowed, the program proceeds to step 96 at which two flags, PrgFlag1 and PrgFlag2, are cleared. At step 98 an electrical signal which enables flash memory 30 for access is applied; continuing on to step 100 activity on /WE is checked. /WE is an electrical input to flash memory which must be set to a particular binary value to allow writing of information into flash memory and thus store a program into said flash memory. If no activity is detected on /WE the program flow remains at state 100 waiting for programming activity. If programming activity is detected, the program continues to step 102 where PrgFlag1 is set to indicate that data is being written into flash memory and continues to step 104 where activity is monitored upon /WE to determine that programming is continuing. If no activity is detected at step 104, the program continues on to step 106 where PrgFlag2 is set to indicate that data has ceased to be written to flash memory. Program flow continues on to step 108 where /WE and /CE are set to a state to disable access to flash memory; microcontroller 44 calculates a check value using a predetermined algorithm for verification of a binary set of values and stores said check value in nonvolatile memory; NVM at step 200. The program continues to step 204 at which ReprogramFlag is cleared to indicate programming of flash memory is complete; the program continues on to step 206 where it halts.

Program flow path taken due to ReprogramFlag set at step 94 allows a program memory device to be programmed by an authorized user. ReprogramFlag can only be set at step 94 from an RMU or RAD and then only if a valid authentication code is received. If ReprogramFlag is not set at step 94, at step 207, microcontroller 44 disconnects address bus of flash memory, disconnects data bus of flash memory from 31, connects data bus connections at 31 to electrical ground; data stored in flash memory is read by microcontroller 44 and a memory signature is calculated by means of a predetermined algorithm. Said memory signature is compared to a previous memory signature calculated by means of an identical predetermined algorithm and stored in NVM. If the memory signature calculated does not compare identically to previous memory signature calculated at step 208, program continues on to step 228 where /CE and /OE is set to a value to disable external access to data stored in flash memory; disabling of /OE and /CE disables gaming apparatus controller 284 and prevents a gaming apparatus from operating. The program continues back to step 90 to wait for further activity. If, at step 208, calculated memory signature of memory contents is identical to a previously calculated memory signature of memory contents stored in NVM then the program continues to step 210 to check for PrgFlag1 set and if not set, the program continues on to step 228 to disable access to flash memory. If, at step 210, PrgFlag1 is set the program continues to step 212 to determine in PrgFlag2 is set; if PrgFlag2 is not set then the program disables access to contents of flash memory at step 228. If PrgFlag1 and PrgFlag2 are set program continues on to step 214 where microcontroller 44 prepares for communication with device 24, which is a remote monitor unit. RcvTryCTR is a register that is loaded with a predetermined value corresponding to a number of attempts to try to establish communication with said remote monitor unit; a memory signature is calculated by means of a predetermined algorithm and the program continues to step 216 where a determination is made of whether valid communication has been received from the remote monitor unit 24. If valid communication has not occurred RcvTryCTR is decremented by a value of 1 at step 230, checked for maximum number of attempts to receive valid communication at step 232; if predetermined maximum number of receive attempts has not been exceeded the program returns to step 216 to check for communication from the remote monitor unit. If maximum number of receive attempts has been exceeded the program continues to step 234 at which /CE and /WE are set to values required to prevent access to flash memory by the gaming apparatus controller; the gaming apparatus controller cannot operate at this point. If a valid receive attempt is received at 216, the program continues on to determine meaning of a value received. At step 218 said received value is checked for a command indicating that the flash memory should be allowed to be reprogrammed; if said command indicates that reprogramming is to be allowed, ReprogramFlag is set at 236 to indicate that programming of flash memory is to be allowed and the program continues back to step 90. If at step 218 the received value is not a command to allow programming of flash memory, the program continues to step 220 where the received command is checked for validity of a command to transmit a memory signature to the remote monitor unit; if not a command to transmit said memory signature, the program continues to step 222 where a check is made for reception of a command from the remote monitor unit indicating that the memory signature received compares identically to a memory signature previously stored in the remote monitor unit; if the memory signature compares identically, the program continues back to step 90. If the memory signature does not compare identically to a memory signature previously stored in the remote monitor unit, the remote monitor unit may transmit a command to disable access to flash memory; this is shown at step 224 where a check is made for a command to disable flash memory. A remote monitor unit may transmit a command to disable gaming apparatus controller access to program memory and thereby disable a gaming apparatus. If at step 220 a command is received to send a memory signature to the remote monitor unit, memory signature calculated at step 92 is transmitted at program step 238. Microcontroller 44 prepares for communication with the remote monitor unit at step 240 by means of loading RcvTryCTR with a predetermined value corresponding to a number of attempts to try to establish communication with the remote monitor unit; at step 242 a determination is made of whether valid communication has been received from the remote monitor unit. If valid communication has not occurred RcvTryCTR is decremented by a value of 1 at step 243, checked for maximum number of attempts to receive valid communication at step 244; if predetermined maximum number of receive attempts has not been exceeded the program returns to step 242 to check for communication from the remote monitor unit. If maximum number of receive attempts has been exceeded the program continues to step 246 at which /CE and /OE are set to values required to prevent access to flash memory by the gaming apparatus controller and thus disable the gaming apparatus. If a valid receive attempt is received at 242, the program continues on set /CE and /OE to values to allow access to flash memory by the gaming apparatus controller at step 248 and then continues on to step 94.

Figure 6:
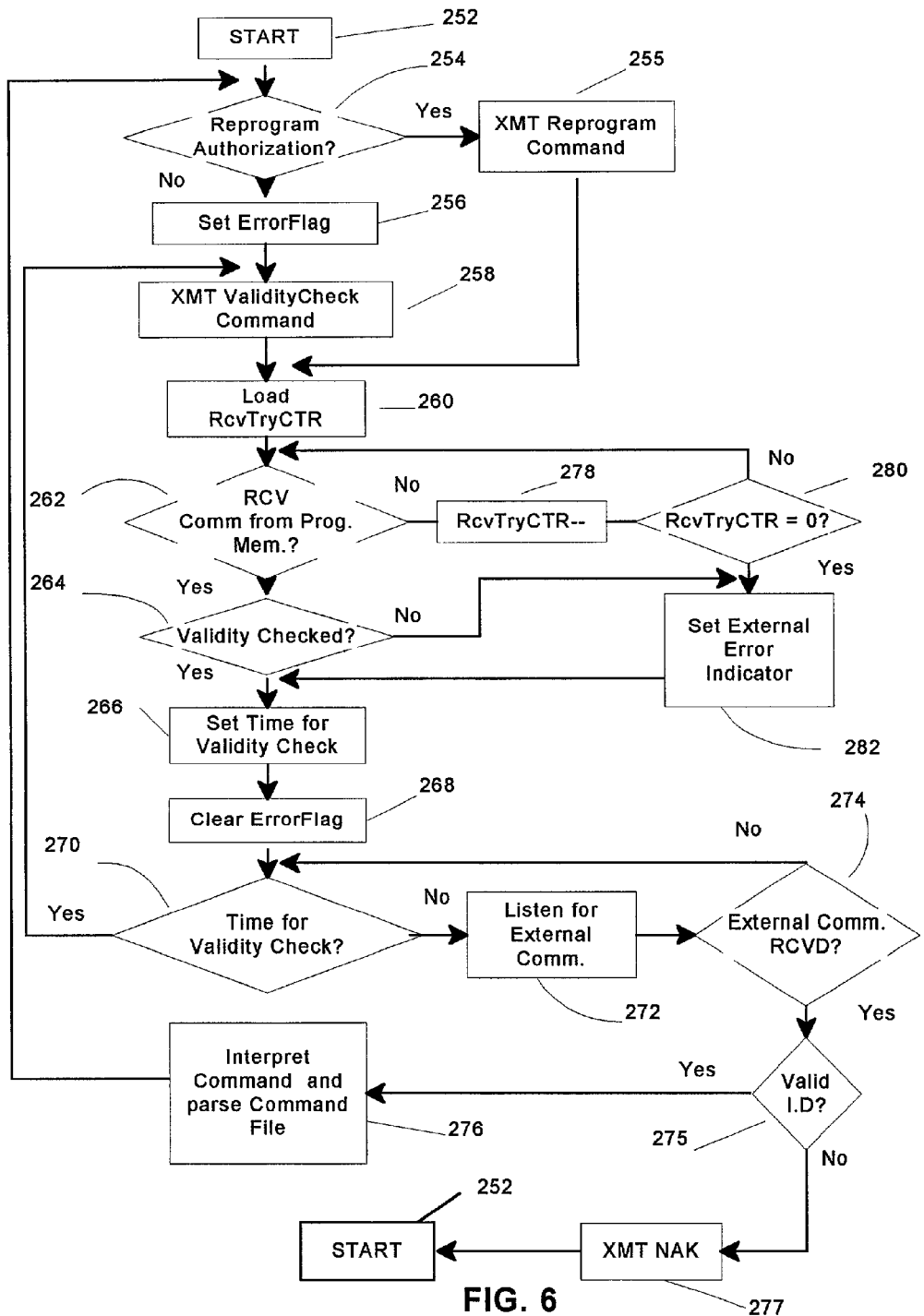
FIG. 6 is a flowchart representation showing operation of a remote monitor unit that communicates with a secure memory device, in accordance with one embodiment of the present invention.

A program flow for operation of a remote monitor unit 24 fixed to a gaming apparatus enclosure is shown in FIG. 6. Program flow begins at step 252 where initialization is performed and continues on to step 254 where a determination of whether a command to allow programming of a secure program is received. If a valid command to allow programming of a secure program memory has been received, the program continues to step 255 where a command to allow programming of program memory in said program memory device is transmitted to the secure program memory. Program flow continues on to step 260 where microcontroller 55 prepares for communication with the secure program memory by means of loading RcvTryCTR with a predetermined value corresponding to a number of attempts to try to establish communication with the secure program memory; at step 262 a determination is made of whether valid communication has been received from the secure program memory 22. If valid communication has not occurred RcvTryCTR is decremented by a value of 1 at step 278, checked for maximum number of attempts to receive valid communication at step 280; if predetermined maximum number of receive attempts has not been exceeded the program returns to step 262 to check for communication from the secure program memory. If maximum number of receive attempts has been exceeded the program continues to step 282 where an error is logged and may be indicated to an attendant. If communication is received from the secure program memory and a memory signature received does not compare with a previous value stored in nonvolatile memory 59 the program continues to step 282 to indicate an error, alert an attendant and store nature of said error in a database. If memory signature received from the secure program memory compares to a previous value stored in nonvolatile memory 59 the program continues to step 266 where a time for a validity check may be predetermined and stored in nonvolatile memory; the program continues to step 268 where an error flag set in step 256 is cleared to indicate that program execution has progressed to a certain point. The program continues to step 270 where system time is compared to a time for a validity check stored in step 266 and if system time is equal to previously stored value of validity check time, proceeds to step 258 to request communication from the secure program memory. If system time is not equal to previously stored value of validity check time stored in 266; check for communication from a remote access device external to the gaming apparatus at step 272. Said remote access device may be a manual-monitoring device carried by an attendant and by means of which program memory device validity is monitored. The program proceeds to step 274 where if external communication is received, program flow continues on to step 275, where determination is made as to whether communication originates from an authorized remote access device. If external communication is from an authorized remote access device, said communication is interpreted at step 276 and program flow continues to step 254 to process the communication. If the communication received is not from an authorized device, the program continues to step 277 where a command is transmitted indicating that communication is not authorized and program flow continues back to start 252.

Figure 7:
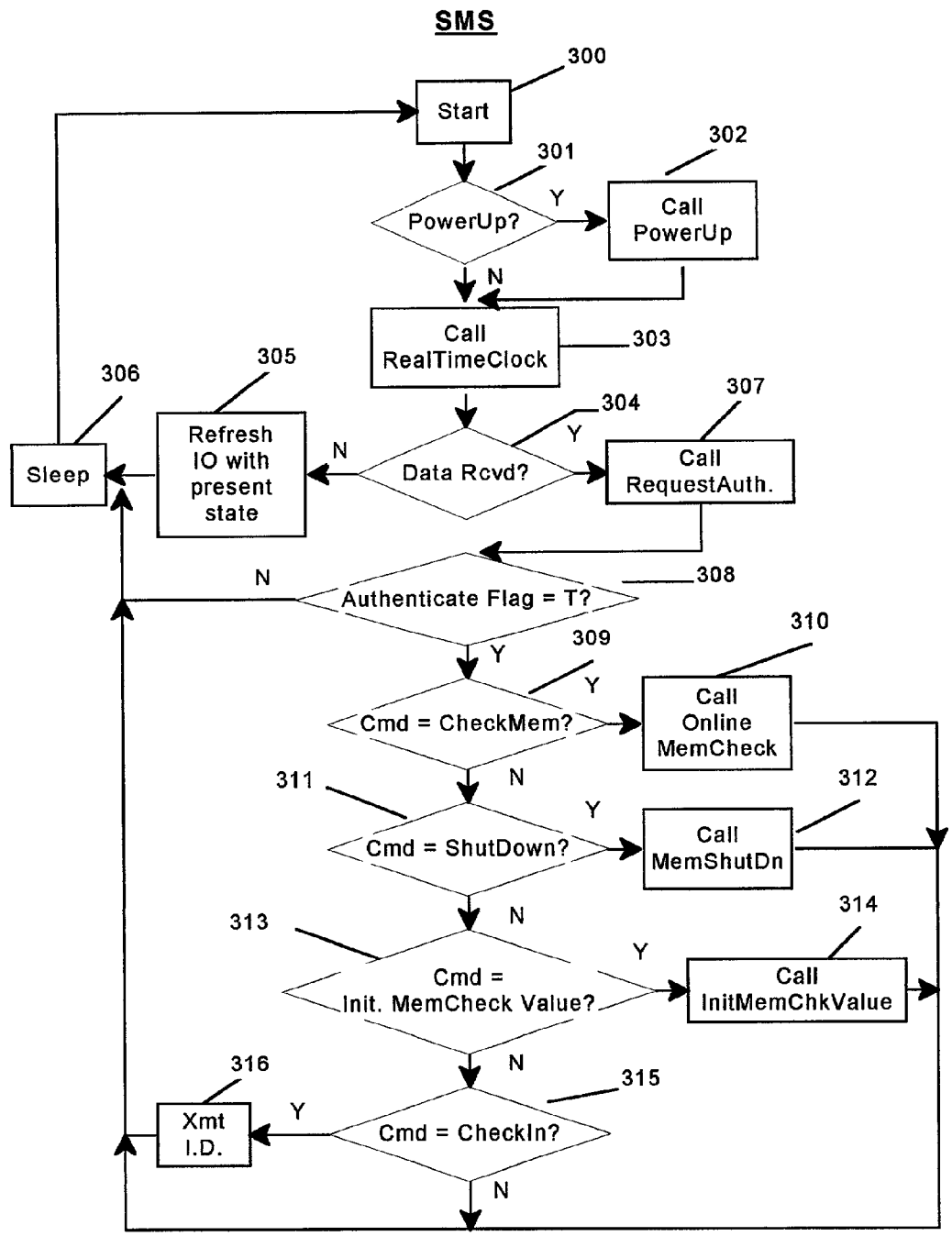
FIG. 7 is a flowchart representation of a secure memory socket, in accordance with one embodiment of the present invention.

FIG. 7 is a flowchart representation of a program running on microcontroller 44 of a secure memory socket, in accordance with one embodiment of the present invention. Said program begins at step 300 after which determination is made as to whether electrical power has been applied to said secure memory socket for first entry of said program; if program has not previously been running an initialization routine to set microcontroller register constants is entered at step 302; if program has previously made at least one pass through step 300 the program proceeds to step 303 where a program routine is entered to allow update of microcontroller local time and date registers. After time and date registers have been updated in step 303, the program proceeds to step 304 where determination of receipt of data from either a remote monitor unit or remote access device is made; if no data has been received, the program proceeds to step 305 where all input/output ports of microcontroller 44 are set to values commensurate with present state of the program and the program proceeds to step 306 in which it enters a low power mode until awakened by an internal timer. Said present state of the program may be altered by conditions as determined by results of program steps 310, 312, 314, and 315. If, at step 304, data from either a remote monitor unit or remote access device is received, the program proceeds to step 307 to authenticate identity of said remote monitor unit or remote access device. If results of authentication indicate that communication with the communicating remote monitor unit or remote access device is allowed, a flag called AuthenicateFlag is set equal to a logic true state to indicate said condition after which the program proceeds to step 308 at which state of said AuthenticateFlag is examined. If the state of the AuthenticateFlag is logic false, the program ignores communication received and proceeds to step 306; if the state of the AuthenticateFlag is logic true the program proceeds to step 309 at which received data is checked for type of command received. If, at step 309, data received is a command to perform an online memory check, a subroutine is called in step 310 to check memory signature of program memory presently inserted into the secure memory socket; after exit from step 310, the program proceeds to step 306. Said subroutine called in step 310 is shown in flowchart representation in FIG. 13. If data received at step 309 is not a command to perform an online memory check, the program continues on to step 311 where data received is checked to determine if a command to disable access to program memory has been received. If a command to disable program memory is received, the program calls a subroutine at step 312 in which access to program memory by an external microcontroller in an apparatus in which the secure memory socket is installed is disabled and the program continues on to step 306. If data received is not a command to disable program memory, received data is checked to determine if it is a command to initialize stored memory signature value to a new memory signature of binary contents of program memory currently inserted into the secure memory socket; if a command to initialize memory signature is received, a subroutine to perform said initialization of memory signature is called in step 314 and upon exit from step 314, the program proceeds to step 306. If data is not a command to initialize memory signature, the program proceeds to step 315 where received data is checked for correspondence to a command to transmit an electronic identifier of the secure memory socket to a device that transmitted the received data; if data received is a request for said electronic identifier of the secure memory socket, the electronic identifier is transmitted to said device requesting data at step 316 and the program proceeds to step 306. If the data received is not valid data as determined at step 315, received data is ignored and the program proceeds to step 306.

Figure 8:
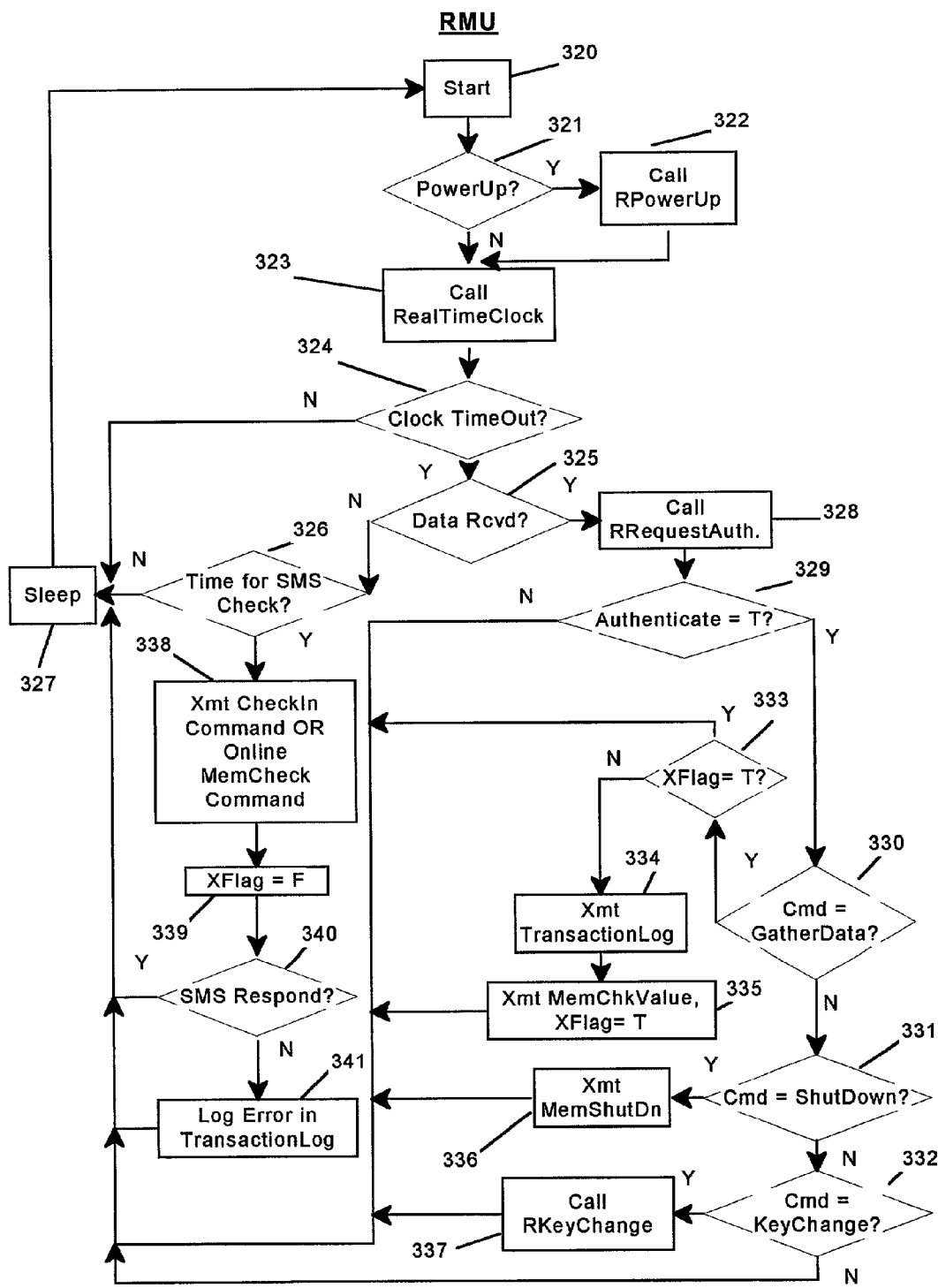
FIG. 8 is a flowchart representation of a remote monitor unit that may communicate with a secure memory socket, in accordance with one embodiment of the present invention.

FIG. 8 is a flowchart representation of a program running on microcontroller 55 of a remote monitor unit, in accordance with one embodiment of the present invention. Said program begins at step 320 from which it proceeds to step 321. At step 321 determination is made as to whether electrical power has been applied to said remote monitor unit for first entry of the program; if program has not previously been running an initialization routine to set microcontroller register constants is entered at step 322; if program has previously made at least one pass through step 320 the program proceeds to step 323 where a program routine is entered to allow update of microcontroller local time and date registers. The program continues on to step 324 where time and date registers are compared to a predetermined time and date; if time and date registers do not compare to said predetermined time and date, the program continues to step 327 where it waits for interrupt by an internal timer running inside microcontroller 55 after receiving said interrupt the program continues to step 320. If time and date registers compare to the predetermined time and date at step 324, the program continues to step 325 to determine if data has been received. If data has not been received, the program continues on to step 326 in which a determination is made as to whether current time and date correspond to a predetermined time and date at which communication with a secure memory socket should be established. If current time and date does not correspond to said predetermined time and date, the program continues on to step 327, if current time and date corresponds to the predetermined time and date for establishing communication with a secure memory socket, the program continues to step 338 at which a command requesting verification of presence or a command requesting a memory signature verification is transmitted to a secure memory socket or to a secure memory device. A microcontroller register location called XFlag is set to a logic false level at program step 339. XFlag is used to indicate to the program that transmission of data from a remote access device has not occurred. The program continues to step 340 at which a determination as to whether a valid response has occurred from a secure memory socket or secure memory device; if a valid response has occurred, the program continues on to step 327, if a valid response has not occurred, an error is indicated and an indication of said error is stored in microcontroller memory called TransactionLog at step 341 from whence the program continues to step 327. If at step 325, data is received, the program continues to step 328 at which a determination is made as to whether communication is authorized with a device requesting communication and a microcontroller memory flag called Authenticate is set to a logic level to indicate whether communication with said device requesting communication is allowed; said memory flag is examined at program step 329 and if logic level is not true, no communication will occur and the program continues on to step 327. If logic level of Authenticate is true at step 329, the program continues on to step 330 at which data received is examined for presence of a command; if said command corresponds to a predetermined value indicating that an external device should be allowed to gather data, the program proceeds to step 333 to determine if data has recently been transmitted; if data has been transmitted, the program continues to step 327, if data has not been transmitted, the program continues to step 334 where memory locations in TransactionLog are transmitted to an external device, at step 335, current memory signature of a secure memory socket or secure memory device reporting to current remote monitor unit is transmitted to an external device; a microcontroller memory location XFlag is set to logic true value to indicate that data has been transmitted and the program continues on to step 327. If, at step 330, data received does not indicate a command to gather data, said data received is compared at step 331 to a predetermined value that indicates that a command to disable access to program memory by microcontroller 44 should be transmitted to a secure memory socket or secure memory device; if the data received corresponds to a value which indicates that disabling of access to program memory is required, a predetermined command is transmitted to a secure memory socket or secure memory device at step 336 after which the program continues on to step 327. If, at step 331, the received data does not correspond to a command to transmit a command to cause a microcontroller included in a secure memory socket or a secure memory device to disable access to program memory, the program continues on to step 332 at which received data is examined for correspondence with a predetermined value that indicates that a cryptographic key is to be changed and if received data does not correspond to any known predetermined value the program continues on to step 327. If received data does correspond to a value to indicate that a cryptographic key is to be changed at step 332, the program proceeds to step 337 at which reception of a new cryptographic key is performed and stored after which the program continues to step 327.

Figure 9:
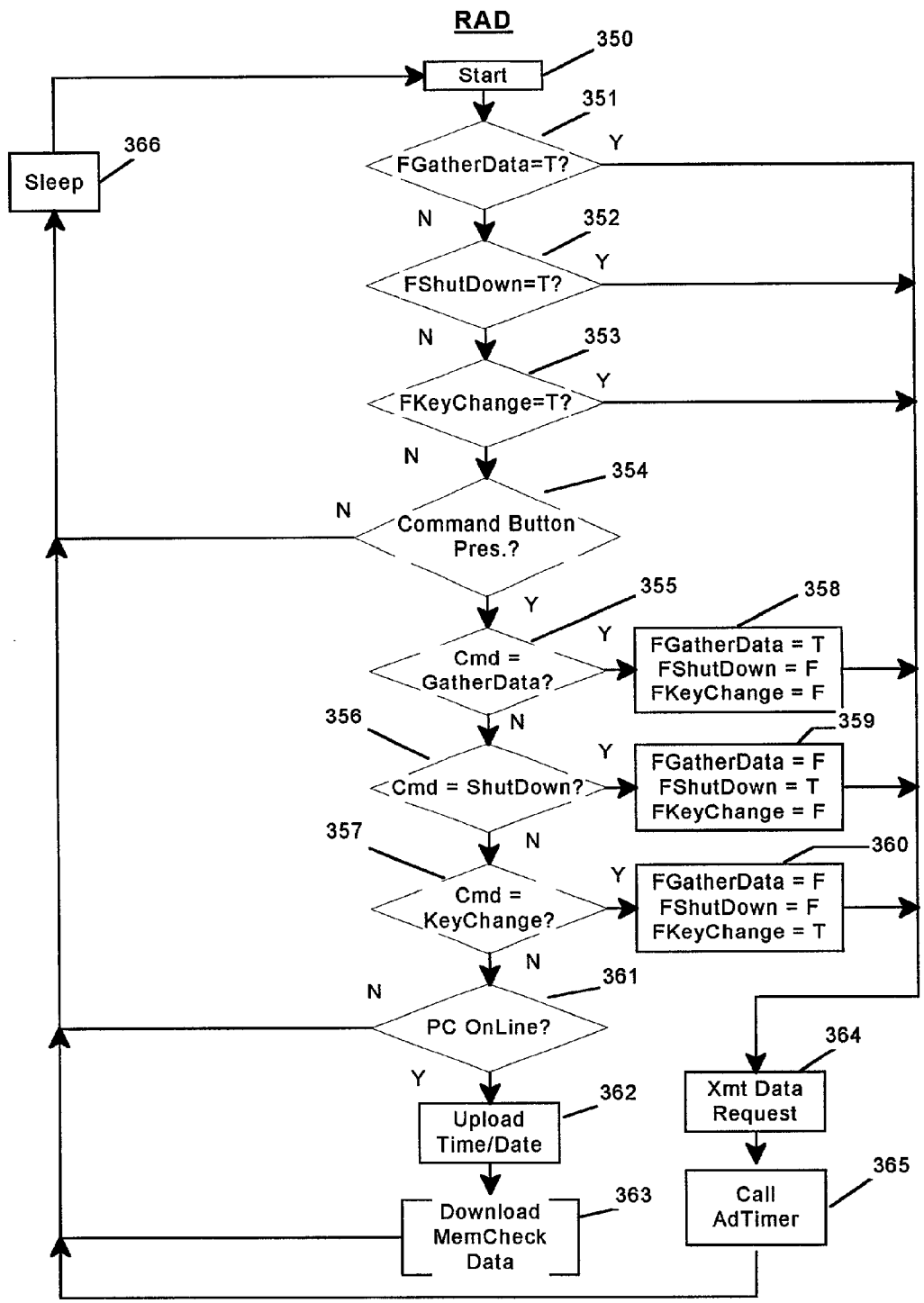
FIG. 9 is a flowchart representation of a program running on a remote access device that may communicate with either a secure memory socket or a remote monitor unit, in accordance with one embodiment of the present invention.
Figure 10:
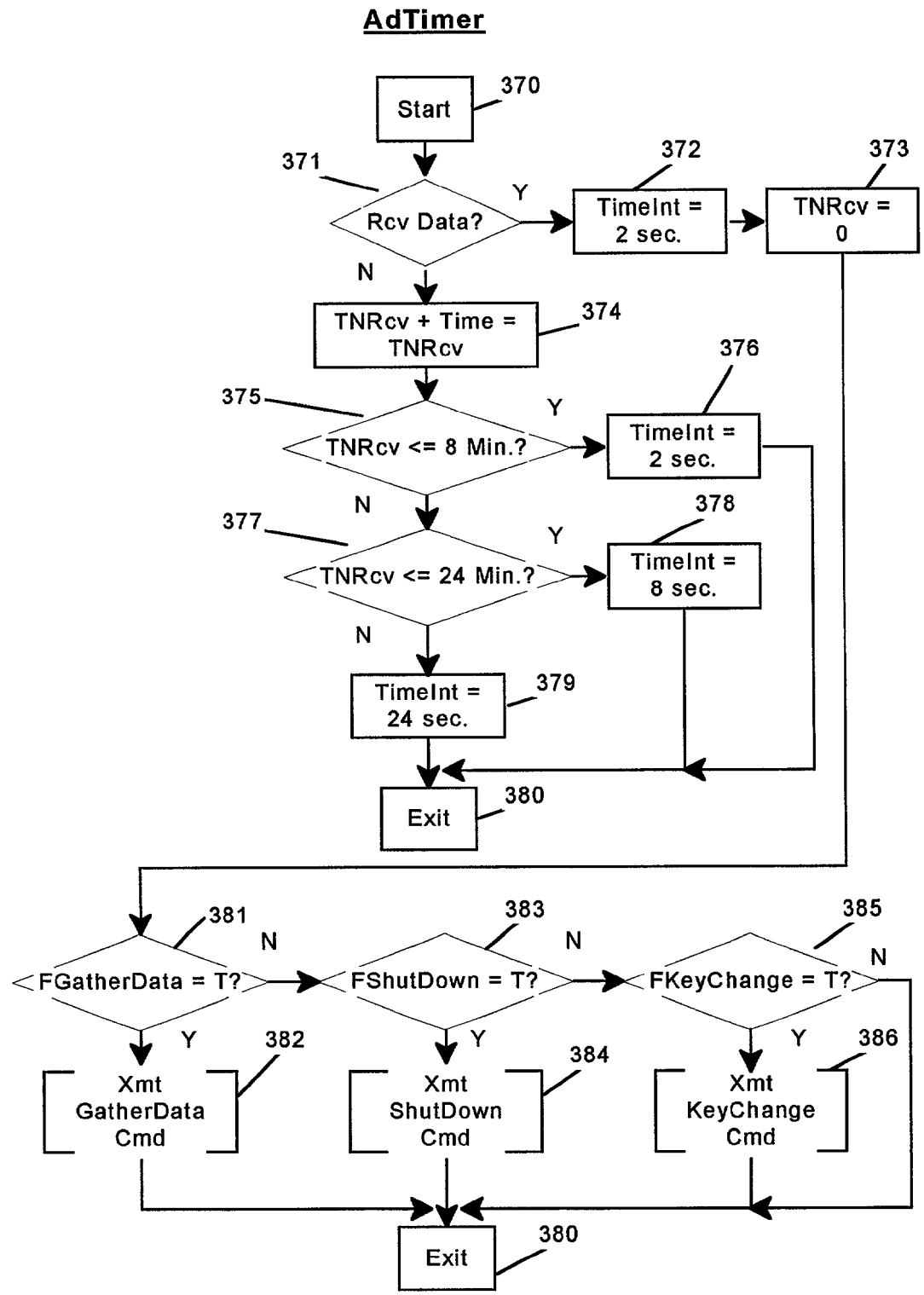
FIG. 10 is a flowchart representation of a program routine which is accessed by operation flow shown in FIG. 9, in accordance with one embodiment of the present invention.
Figure 19:
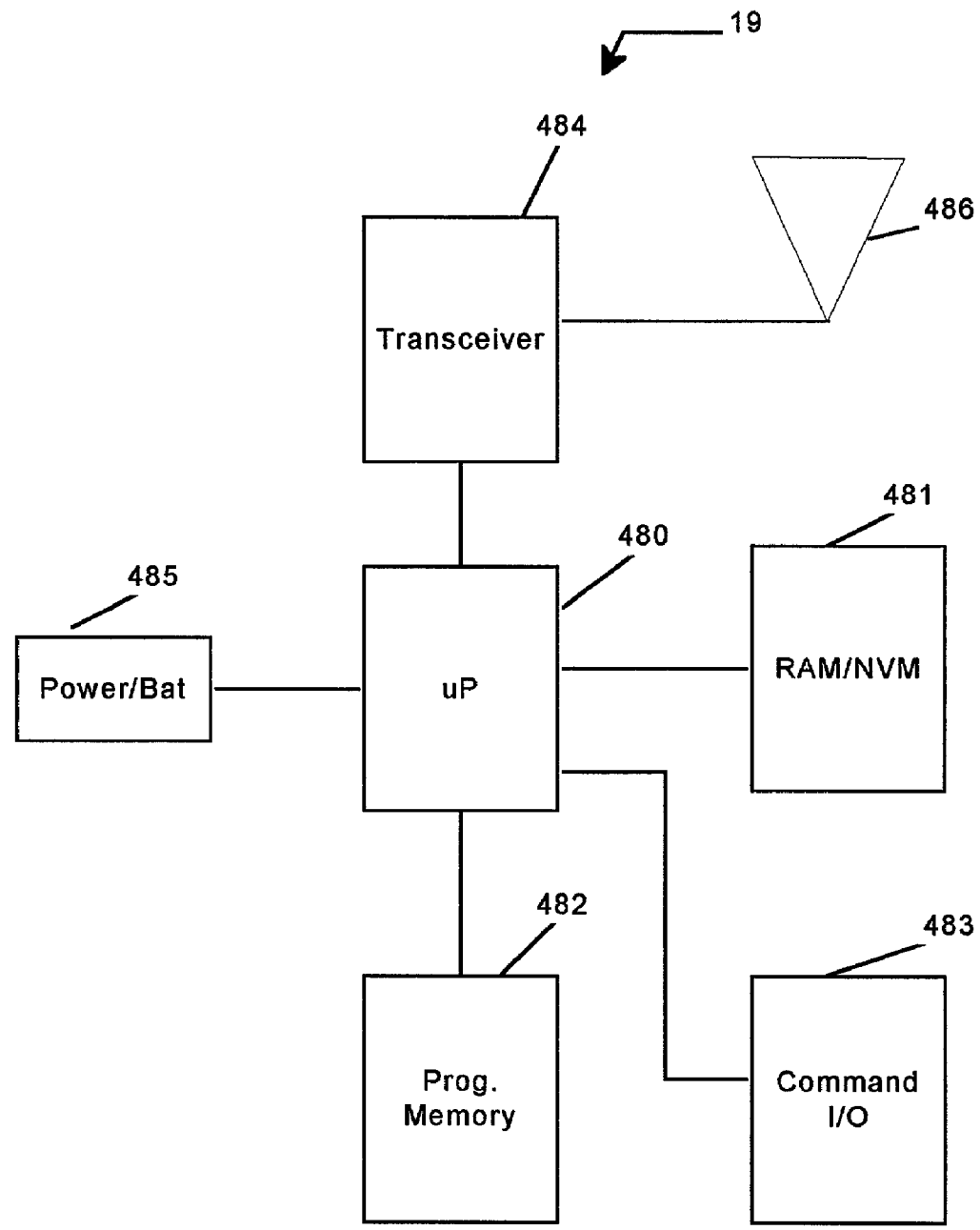
FIG. 19 is a block diagram representation of a remote access device, which operates to collect data and send commands to a remote monitor unit, a secure memory device or a secure socket, in accordance with one embodiment of the present invention.

FIG. 9 is a flowchart representation of a program running on microcontroller 480 of a remote access device shown in block diagram form in FIG. 19, in accordance with one embodiment of the present invention. Said program begins execution at step 350 and continues to step 351 at which a logic flag in microcontroller memory, FGatherData, is examined for a logical true state; if FGatherData is at a logical true state, the program continues to step 364 where a request for data is transmitted to a secure memory socket, secure memory device or a remote monitor unit. The program proceeds to step 365 where a subroutine, which is represented in flowchart form in FIG. 10, is called; after exit from step 365, the program proceeds to step 366 and remains at step 366 until interrupted by an internal timer running in microcontroller 480 after S5 which program execution begins at step 350. If, at program step 351, FGatherData is not at a logical true state, program execution continues to step 352 at which a logic flag in microcontroller memory, FShutDown, is examined for a logical true state; if FShutDown is at a logical true state, the program continues to step 364 where a request for data is transmitted to a secure memory socket, secure memory device or a remote monitor unit. The program proceeds to step 365 where a subroutine, which is represented in flowchart form in FIG. 10, is called; after exit from step 365, the program proceeds to step 366. If, at program step 352, FShutDown is not at a logical true state, program execution continues to step 353 at which a logic flag in microcontroller memory, FKeyChange, is examined for a logical true state; if FKeyChange is at a logical true state, the program continues to step 364 where a request for data is transmitted to a secure memory socket, secure memory device or a remote monitor unit. The program proceeds to step 365 where a subroutine, which is represented in flowchart form in FIG. 10, is called; after exit from step 365, the program proceeds to step 366. If, at program step 353, FKeyChange is not at a logical true state, program execution continues to step 354 at which a determination as to whether an external electronically readable device is present and if not present, program continues to step 366; if said electronically readable device is present, program execution continues to step 355 at which data read from the external electronically readable device present at step 354 is examined. If, at step 355, data read at step 354 compares to a predetermined value which corresponds to a command to gather data from a secure memory socket, secure memory device or remote monitor unit, program continues to step 358 at which memory flag FGatherData is set to a logical true state, memory flags FShutDown and FKeyChange are set to a logical false state after which program continues on to step 364. If, at step 355, data read at step 354 does not compare to a predetermined value that corresponds to a command to gather data, program continues to step 356 at which data read at step 354 is compared to a predetermined value which indicates that a command to disable access to program memory inserted into a secure memory socket or included upon a secure memory device should be transmitted to said secure memory socket, said secure memory device or a remote monitor unit; if said comparison is true, program continues to step 359 at which memory flag FshutDown is set to a logical true state, memory flags FGatherData and FKeyChange are set to a logical false state after which program continues on to step 364. If, at step 356, data read at step 354 does not compare to a predetermined value that corresponds to a command to disable access to program memory by a remote device, program continues to step 357 at which data read at step 354 is compared to a predetermined value which indicates that a command to change a cryptographic key contained within a program running upon a microcontroller included upon a secure memory socket, secure memory device or remote monitor unit should be transmitted to said secure memory socket, said secure memory device or said remote monitor unit; if said comparison is true, program continues to step 360 at which memory flag FKeyChange is set to a logical true state, memory flags FGatherData and FshutDown are set to a logical false state after which program continues on to step 364. If, at step 357, data read at step 354 does not compare to a predetermined value that corresponds to a command to change cryptographic keys within a remote device, program continues to step 361 at which a determination is made as to whether a computer is connected to a remote access device upon which the program presently being described is running; if a computer is determined to not be connected at step 361, program continues on the step 366. If a computer is determined to be connected at step 361, time and date from an internal clock contained within said computer are uploaded to said connected remote access device at step 362 and program continues to step 363 where data contained in microcontroller memory included within the connected remote access device are uploaded to the connected computer; program then continues to step 366.

FIG. 10 is a flowchart representation of a subroutine that is entered at step 365 of FIG. 9, in accordance with one embodiment of the present invention. Program execution begins at step 370 and continues to step 371 where a determination is made as to whether data has been received. If data has been received at step 371, program continues to step 372 where internal timer interrupt time is set equal to 2 seconds after which program continues to step 373 where a flag, TNRcv, in microcontroller memory is set to a logical zero state after which program continues to step 381 where a determination is made as to whether a flag in microcontroller memory, FGatherData, is at a logical true state. Details of where said flag is set and cleared may be seen by examination of FIG. 9. If the flag is at a logical true state, a command to gather data is transmitted at step 382 and the program exits at step 380. If the flag is at a logical false state, program continues to step 383 where a determination is made as to whether a flag in microcontroller memory, FShutDown, is at a logical true state. Details of where said flag is set and cleared may be seen by examination of FIG. 9. If the flag is at a logical true state, a command to disable access to program memory is transmitted at step 384 and the program exits at step 380. If the flag is at a logical false state, program continues to step 385 where a determination is made as to whether a flag in microcontroller memory, FKeyChange, is at a logical true state. Details of where said flag is set and cleared may be seen by examination of FIG. 9. If the flag is at a logical true state, a command to allow change of cryptographic keys contained in microcontroller memory of a microcontroller included upon a secure memory socket, secure memory device or remote monitor unit is transmitted at step 386 and the program exits at step 380. If the flag is at a logical false state at step 385, program exits at step 380. If, at step 371, data has not been received, location TNRcv in microcontroller memory is incremented by a value, Time, at step 374 and determination as to whether said memory location is less than or equal to 8 minutes at step 375. If the memory location TNRcv is less than or equal to 8 minutes, internal timer interrupt time is set equal to 2 seconds after which program continues to step 380 and exits. If the memory location TNRcv is greater than 8 minutes at step 375, program continues to step 377 at which determination is made as to whether microcontroller memory location, TNRcv, is less than or greater than 24 minutes. If TNRcv is less than or equal to 24 minutes, program continues to step 378 at which internal timer interrupt time is set equal to 8 seconds after which program continues to step 380 and exits. If, at step 377, TNRcv is greater than 24 minutes, internal timer interrupt time is set equal to 24 seconds after which program continues to step 380 and exits.

Figure 11B:
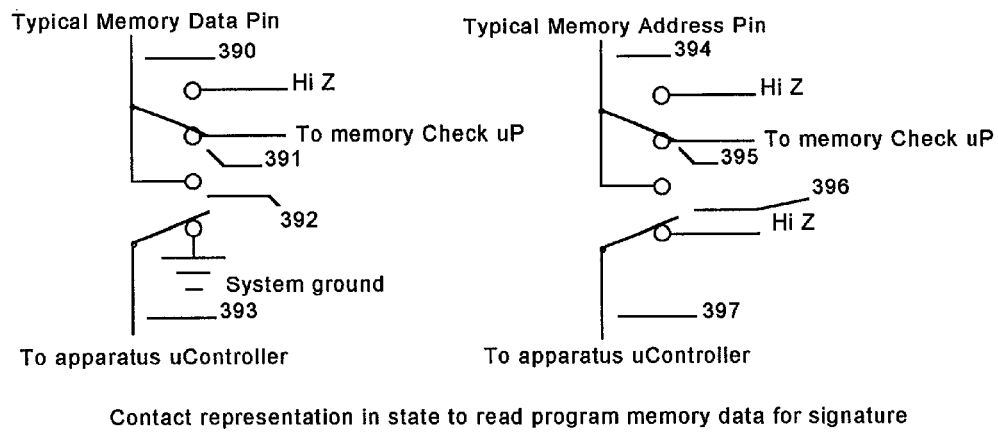
FIG. 11B is another schematic representation of typical electrical paths in a secure memory socket or secure memory device, in accordance with one embodiment of the present invention.
Figure 11A:
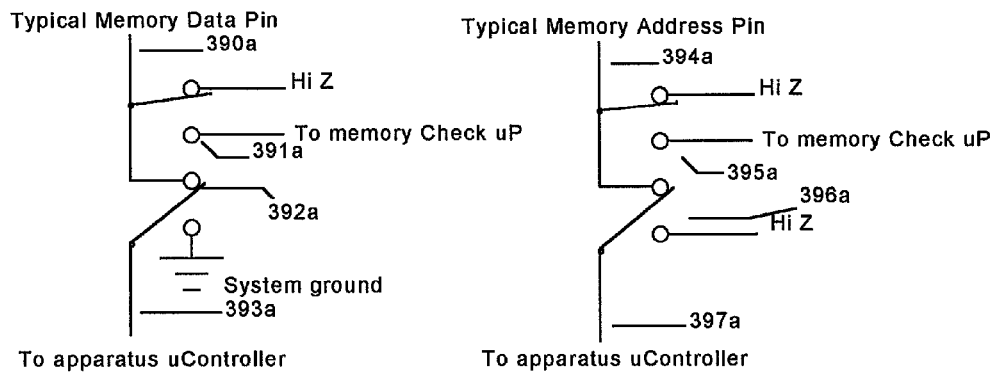
FIG. 11A is a schematic representation of typical electrical paths in a secure memory socket or secure memory device, in accordance with one embodiment of the present invention.

FIG. 11A is a schematic representation of typical electrical paths in the present invention between program memory and a microprocessor 292 included upon an apparatus controller 284, in accordance with one embodiment of the present invention. A typical program memory data pin connection is shown in 390a . . . 393a. Conductive electrical path in said typical program memory data pin connection includes connection to program memory chip at 390a, proceeding to connection to microprocessor 292 included upon an apparatus controller 284 at 393a; said conductive electrical path is a direct connection from 390a to 393a. A typical program memory address pin connection is shown in 394a . . . 397a. Conductive electrical path in said typical program memory address pin connection includes connection to program memory chip at 394a, proceeding to connection to a microprocessor 292 included upon an apparatus controller 284 at 397a; said conductive electrical path is a direct connection from 394a to 397a. Electrical paths shown in FIG. 11A are as required for normal operation of a microprocessor included upon an apparatus and are as connected by a secure memory socket or secure memory device when said device is in an operational state to allow normal operation of program memory.

FIG. 11B is a schematic representation of typical electrical paths in the present invention between program memory and a microprocessor 292 included upon an apparatus controller 284, in accordance with one embodiment of the present invention. The secure memory socket or a secure memory device is in a state to deny access by a microprocessor accessing program memory and depending upon said program memory for operation; said schematic representation is also typical of electrical paths when a secure memory socket or secure memory device is in a mode to acquire a memory signature of the program memory by means of reading the program memory and performing a predetermined mathematical calculation upon data obtained. A typical program memory data pin connection is shown in 390 to 391 which places program memory data connection in contact with microcontroller 44, simultaneously electrical contact between program memory data pin and microprocessor 292 on an apparatus control board 284 is unconnected and data connection of 292 is in contact with electrical ground or datum. A typical program memory address pin connection is shown in 394 . . . 397. Conductive electrical path in said typical program memory address pin connection includes connection to program memory chip at 394, proceeding to connection to microcontroller 44, simultaneously electrical contact between program memory address pin and microprocessor 292 on an apparatus control board 284 is unconnected.

Figure 12:
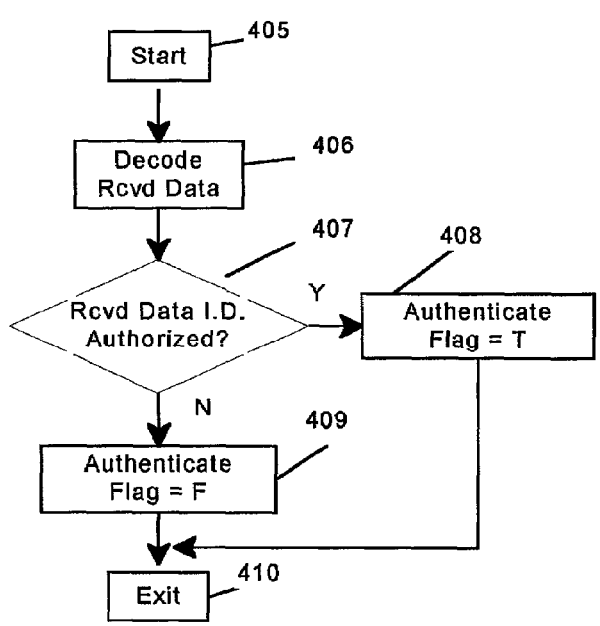
FIG. 12 is a flowchart representation of a program routine, which is accessed by operation flow shown in FIG. 7, in accordance with one embodiment of the present invention.

FIG. 12 is a flowchart representation of a program routine referenced at step 307 of FIG. 7, in accordance with one embodiment of the present invention. Said program routine begins at step 405 and continues to step 406 at which data received at step 304 is decoded. Program continues on to step 407 at which said data is analyzed for presence of an authorized identification unique to a remote monitoring unit or a remote access device; if said unique identification compares to a predetermined identification stored in microcontroller 44 memory, program continues to step 408 at which a register location in said microcontroller memory is set to a logical true state after which program continues to step 410 and exits. If the unique identification does not compare to a predetermined identification stored in microcontroller memory, program continues to step 409 at which said register location in the microcontroller memory is set to a logical false state after which program continues to step 410 and exits.

Figure 13:
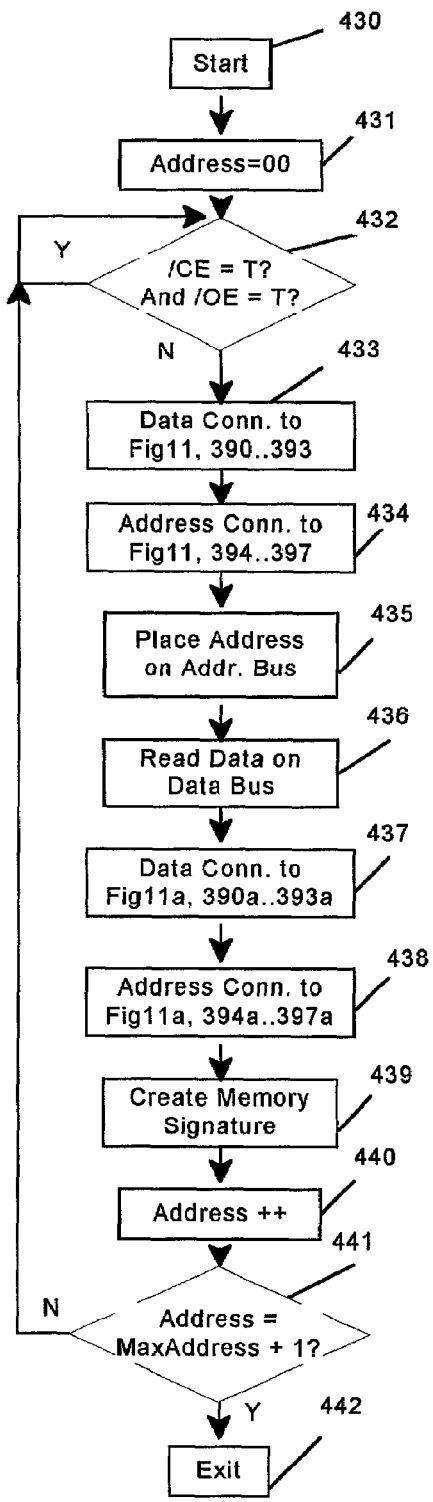
FIG. 13 is a flowchart representation of a program routine, which is accessed by operation flow shown in FIG. 7, in accordance with one embodiment of the present invention.

FIG. 13 is a flowchart representation of a program routine referenced at step 310 of FIG. 7, in accordance with one embodiment of the present invention. Said program routine begins at step 430 and continues to step 431 at which an address location counter in microcontroller 44 memory is initialized to a base address, program continues to step 432 at which determination as to whether memory enable input and memory data output enable input of 22, which may be a secure memory socket or a secure memory device, containing a program memory from which a microcontroller 292 reads data are at a logical true state; if one or both of said lines is at a logical true state, program waits at step 432 until both lines are at a logical false state. If both of the lines are at a logical false state, program continues to step 433 at which data lines of program memory are connected to microcontroller 44 and data lines connected to microprocessor 292 are connected to electrical ground; data lines could be connected to a predetermined binary pattern at this point if required. Program continues to step 434 at which address lines of program memory are connected to microcontroller 44 and address lines connected to microprocessor 292 are connected to an open circuit. At step 435, microcontroller 44 places an address on program memory data bus after which a data byte is read at step 436. Program continues to step 437 where data lines of program memory are connected to microprocessor 292; after which program continues to step 438 at which address lines of program memory are connected to microprocessor 292. Actions at program steps 437 and 438 connect program memory to microprocessor 292 and allow program execution from said program memory. Program continues to step 439 at which a memory signature is formed by means of a predetermined algorithm running on microcontroller 44. Program continues to step 440 at which next sequential program memory address to be examined is readied for presentation to program memory. At program step 441 address to be presented to program memory for reading of data at addressed program memory location is compared to a predetermined upper limit corresponding to memory size and if not greater than maximum memory address allowed, plus one, program returns to step 432 to read next succeeding program byte. If, at step 441, it is determined that all memory locations in program memory have been examined, program exits at step 442.

Figure 14:
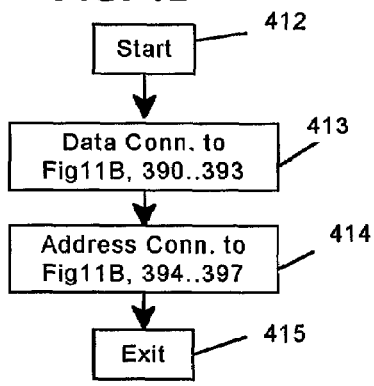
FIG. 14 is a flowchart representation of a program routine, which is accessed by operation flow shown in FIG. 7, in accordance with one embodiment of the present invention.

FIG. 14 is a flowchart representation of a program routine referenced at step 312 of FIG. 7, in accordance with one embodiment of the present invention. Said program routine begins at step 412 and continues to step 413 at which data lines of program memory are connected to microcontroller 44 and data lines connected to microprocessor 292 are connected to electrical ground; data lines could be connected to a predetermined binary pattern at this point if required. Program continues to step 414 at which address lines of program memory are connected to microcontroller 44 and address lines connected to microprocessor 292 are connected to an open circuit. Effect of actions performed at program steps 413 and 414 are to disable access to program memory by microprocessor 292 and effectively halt program execution. Program continues to step 415 and exits.

FIG. 15 is a flowchart representation of a program routine referenced at step 314 of FIG. 7, in accordance with one embodiment of the present invention. Said program routine begins at step 465 and continues to step 466 at which an address location counter in microcontroller 44 memory is initialized to a base address, program continues to step 467 at which data lines of program memory are connected to microcontroller 44 and data lines connected to microprocessor 292 are connected to electrical ground; data lines could be connected to a predetermined binary pattern at this point if required. Program continues to step 468 at which address lines of program memory are connected to microcontroller 44 and address lines connected to microprocessor 292 are connected to an open circuit. At step 469, microcontroller 44 places an address on program memory data bus after which a data byte is read at step 470. Program continues to step 470 at which a memory signature is formed by means of a predetermined algorithm running on microcontroller 44. Program continues to step 472 at which next sequential program memory address to be examined is readied for presentation to program memory. At program step 473 address to be presented to program memory for reading of data at addressed program memory location is compared to a predetermined upper limit corresponding to memory size and if not greater than maximum memory address allowed, plus one, program returns to step 469 to read next succeeding program byte. If, at step 473, it is determined that all memory locations in program memory have been examined, program continues to step 474 at which a complete memory signature is stored in nonvolatile memory contained upon microcontroller 44. Program continues to step 475 where data lines of program memory are connected to microprocessor 292; after which program continues to step 476 at which address lines of program memory are connected to microprocessor 292. Actions at program steps 475 and 476 connect program memory to microprocessor 292 and allow program execution from said program memory. Program continues to exit at step 477. Effect of program routine described in FIG. 15 is to compute a program memory signature while simultaneously disabling a microprocessor depending upon said program memory for execution instructions; storing said program memory signature and releasing the program memory for access by said microprocessor.

Figure 16:
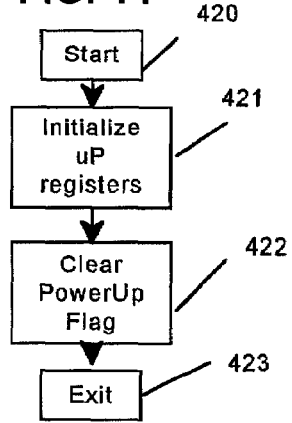
FIG. 16 is a flowchart representation of a program routine, which is accessed by operation flow shown in FIG. 7, in accordance with one embodiment of the present invention.

FIG. 16 is a flowchart representation of a program routine referenced at step 302 of FIG. 7, in accordance with one embodiment of the present invention. Said program routine begins at step 420 and continues to step 421 where predetermined registers of microcontroller 44 are set to known predetermined values; program continues to step 422 at which an internal register of said microcontroller is reset to a known state to indicate to program flow that power up reset initialization has been accomplished. Program continues to step 423 and exits.

FIG. 17 is a flowchart representation of a program routine referenced at step 322 of FIG. 8, in accordance with one embodiment of the present invention. Said program routine begins at step 450 and continues to step 451 where predetermined registers of microcontroller 55 are set to known predetermined values; program continues to step 452 at which an internal register of said microcontroller is reset to a known state to indicate to program flow that power up reset initialization has been accomplished. Program continues to step 453 and exits.

FIG. 18 is a flowchart representation of a program routine referenced at step 328 of FIG. 8, in accordance with one embodiment of the present invention. Said program routine begins at step 455 and continues to step 456 at which data received at step 325 is decoded. Program continues on to step 457 at which said data is analyzed for presence of an authorized identification unique to a remote monitoring unit or a remote access device; if said unique identification compares to a predetermined identification stored in microcontroller 55 memory, program continues to step 458 at which a register location in said microcontroller memory is set to a logical true state after which program continues to step 460 and exits. If the unique identification does not compare to a predetermined identification stored in microcontroller memory, program continues to step 459 at which said register location in the microcontroller memory is set to a logical false state after which program continues to step 410 and exits.

FIG. 19 is a block diagram of a remote access device, in accordance with one embodiment of the present invention. Said remote access device functions to gather data from or send commands to a remote monitor unit, secure memory device or secure memory socket. The remote access device may include a microprocessor 480, which runs a program, a flowchart representation of which is shown in FIG. 9, contained within program memory 482 and which employs nonvolatile random access memory 481 as read-write data memory. The remote access device may be a portable device and may be powered by a battery or direct current power supply 485. Communication between the remote access device and a secure memory device, secure memory socket, remote monitor unit or a personal computer may be by means of transceiver 484 and interface device 486 or may be by means of command input-output device 483.

Figure 20:
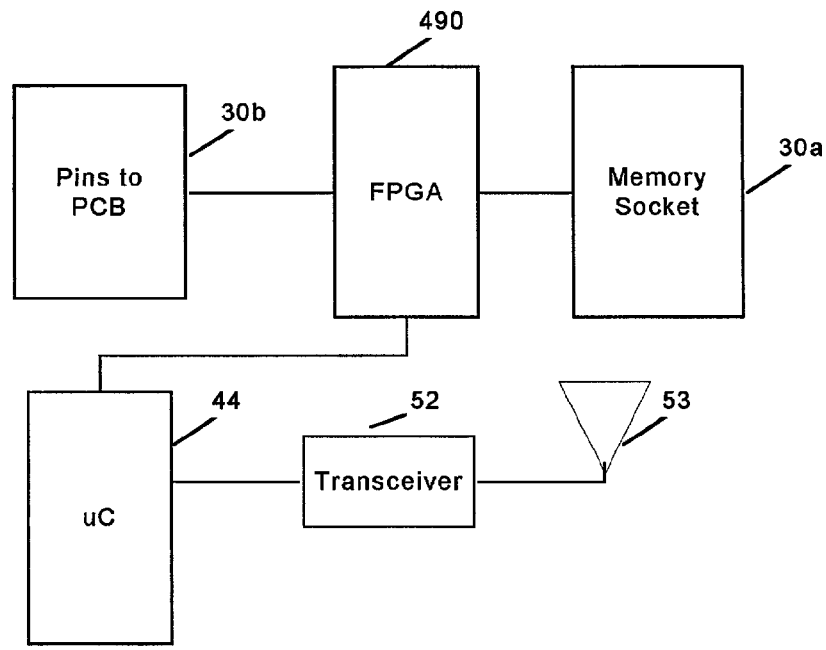
FIG. 20 is a block diagram representation of a preferred embodiment of a secure memory socket, in accordance with one embodiment of the present invention.

FIG. 20 is a block diagram of a preferred embodiment of a secure memory socket, in accordance with one embodiment of the invention. FIG. 20 is discussed further below in the section related to practical implementations of the invention.

Figure 21:
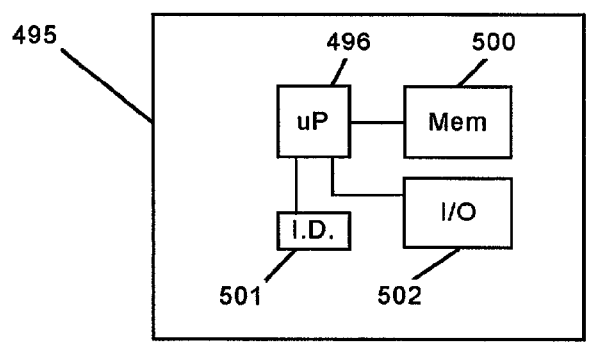
FIG. 21 is a block diagram representation of a component of a distributed processor configuration, in accordance with one embodiment of the present invention.

FIG. 21 is a block diagram of an element of a distributed processor configuration, in accordance with one embodiment of the present invention. Said distributed processor configuration is a style of system architecture in which modules comprising a system embody decision making capability independent of a central control unit. In a non-distributed system, modules comprising said system generally and typically are electrical extensions of a central control unit. Distributed processor module 495 may be comprised of microprocessor 496, electronic memory 500, electronically readable identification 501 and an electronic input/output device 502, said electronic input/output device conveys data to and from said microprocessor 496. Said distributed processor module may be any element 503, 504, 505, 506 of a typical distributed processor system shown in block diagram form in FIG. 22; distinction between tasks modules perform is by means of change in type of input output device 502 and a program running on microprocessor 496. A method of protecting a distributed processor system from performing unwanted actions due to program memory containing defective data is shown in flowchart form in FIG. 23, which is a representation of a program that may be running on any module of typical distributed processor system shown in FIG. 22.

Figure 22:
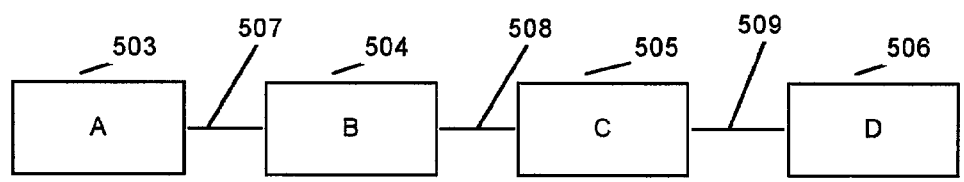
FIG. 22 is a block diagram of a typical distributed processor configuration, in accordance with one embodiment of the present invention.

FIG. 22 show modules 503, 504, 505, 506, which represent typical interconnected distributed processor elements, in accordance with one embodiment of the present invention. These elements may be interconnected by communication paths 507, 508, and 509. Any number of elements may be interconnected as required by a task to be performed by said distributed processor system.

Figure 23:
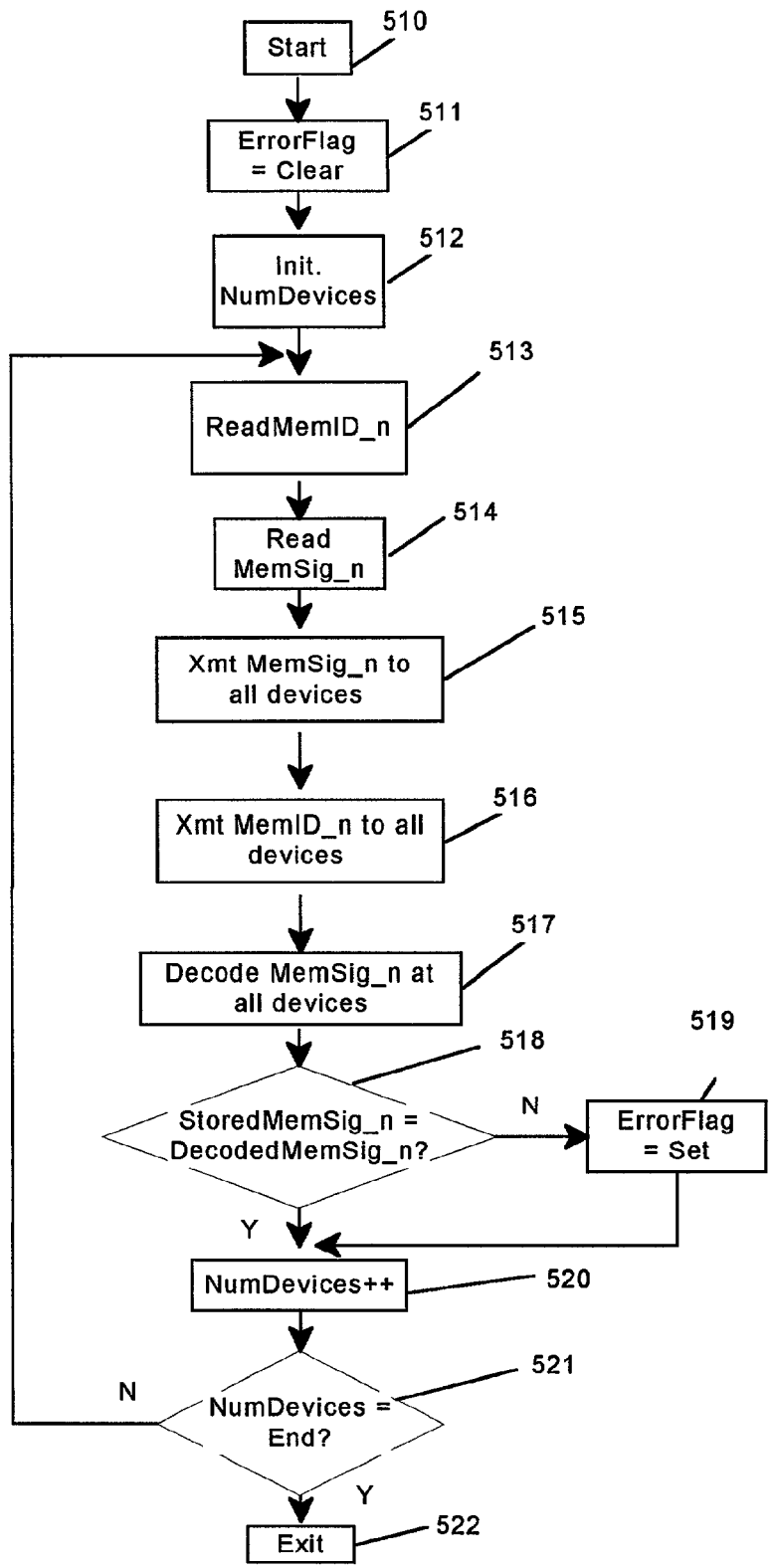
FIG. 23 is a flowchart representation of a program, which may be running on a microprocessor included upon a component of a distributed processor configuration, in accordance with one embodiment of the present invention.

FIG. 23 is a flowchart for a method of protecting a distributed processor system from performing unwanted actions due to program memory containing defective data, in accordance with one embodiment of the present invention. The program begins at step 510 and proceeds to step 511 at which a memory location in microprocessor 496 memory is set to a logical state to indicate that no errors have occurred in memory verification; program continues to step 512 at which a memory location in said microprocessor memory is set to a value to represent a count of modules comprising a distributed processor system in which a check for program validity is required. Program continues to step 513 at which a value is read from electronic identification device 501; program memory signature is calculated for an initial module in a distributed processor system at step 514; said program memory signature calculation includes means for including a value representing said value read from said electronic identification device in step 513. Program continues to step 515 at which said program memory signature calculated in step 514 is transmitted to all modules comprising said distributed processor system after which a value read from the electronic identification device in step 513 is transmitted to all modules comprising the distributed processor system. Continuing on to step 517, all modules comprising the distributed processor system perform a decoding of the transmitted program memory signature using an algorithm which employs a value transmitted in step 516 as a decryption key value and, in step 518, compare a program memory signature previously stored in nonvolatile microprocessor memory to program memory signature decoded in step 517. At step 518, if said comparison of stored value of program memory signature compares to calculated program memory signature, program continues on to step 520 where a command is sent to next succeeding module comprising the distributed system and if final device of the distributed system has not performed memory check at step 521 continues back to step 513 to resume checking program memory contained in all modules. If, at step 518, the comparison of stored value of program memory signature does not compare to calculated program memory signature at any module comprising the distributed system, a memory location in microprocessor memory is set to a logical value to indicate no comparison at step 519 and program continues to step 520.

Figure 24:
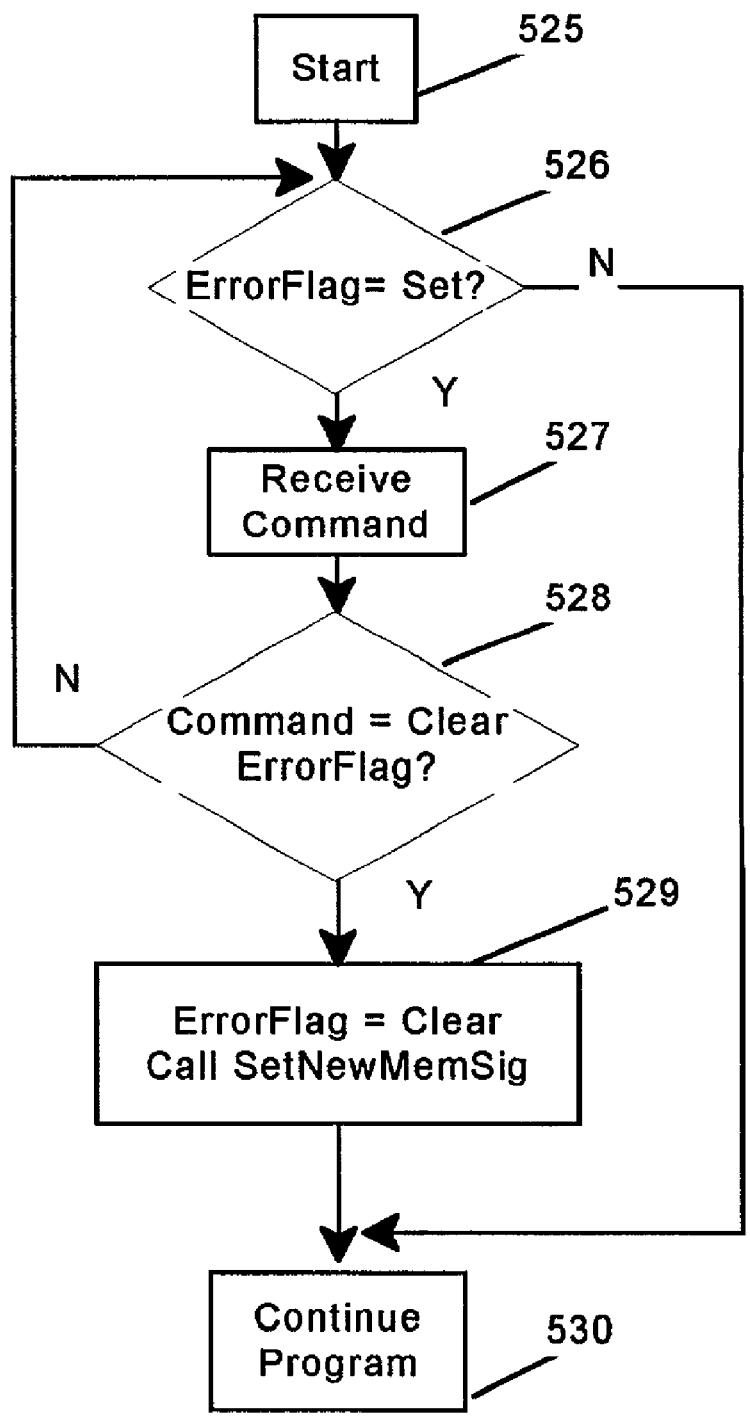
FIG. 24 is a flowchart representation of a portion of program beginning, which may be running on a microprocessor included upon a component of a distributed processor configuration, in accordance with one embodiment of the present invention.

FIG. 24 is a flowchart representation of a portion of a program beginning for a program running upon all modules comprising a distributed processor system, in accordance with one embodiment of the present invention. Program begins at step 525 and proceeds to step 526 where a determination is made as to whether an error flag that is acted upon by program flow illustrated in FIG. 23, 519 is at a logical true value; if said error flag is at a logical true value, program continues to step 527 to wait for a command after which program flow continues to step 528 to determine whether said command corresponds to a value to clear the error flag and set a new memory signature. If the command corresponds to a predetermined value which indicates that program memory signature should be changed, program performs said action at step 529 after which program execution of a main program memory module is entered at step 530; main program memory execution may also be entered from step 526 if the error flag is not set to a logical true value. If, at step 528, the command does not correspond to a predetermined value that indicates that program memory should be changed, program flow is to step 526 and main program execution is bypassed until conditions are changed to allow entry.

Figure 25:
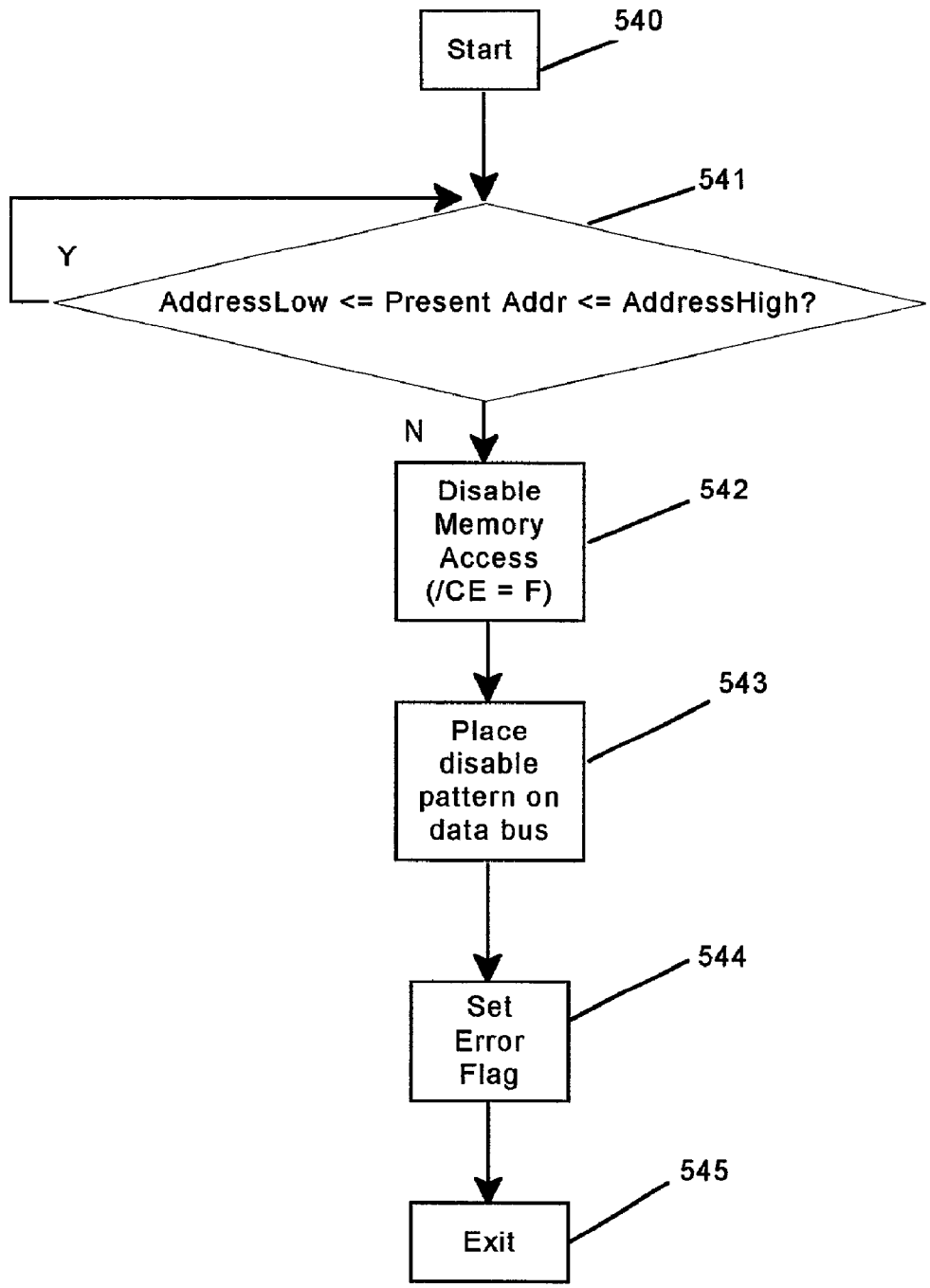
FIG. 25 is a flowchart representation of a portion of a program, which may be running upon a secure memory socket or upon a secure memory device and which allows a dynamic check of allowed boundaries of program memory access, in accordance with one embodiment of the present invention.

FIG. 25 is a flowchart representation of a portion of a program, which may be running upon a secure memory socket or a secure memory device, in accordance with one embodiment of the present invention. Said program begins at 540 at which any required initialization is performed. The program continues to 541 at which boundaries of program memory addresses are compared to memory addresses placed upon program memory bus by a microprocessor executing instruction stored in said program memory. If, at 541, address presented to the program memory is within predetermined high and low bounds, the program returns to compare next address presented to program memory to said predetermined high and low bounds. If, at 541, address presented to the program memory is not within predetermined high and low bounds, the program continues to 542 at which access to program memory is disabled, and continues on to 543 at which a predetermined pattern is placed upon the program memory data bus. Effect of actions in 542 and 543 is to disable a microprocessor depending upon program memory for program instruction. Actions 542 and 543 maintain control device stability after disabling memory access by placing a disable pattern on the bus. Program continues to 544 at which a location in program memory is set to a predetermined state to indicate an error has occurred to a program calling the program described in FIG. 25 and the program exits at 545.

Figure 26:
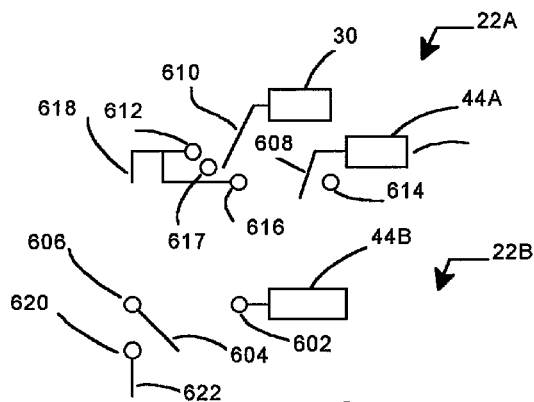
FIG. 26 is a block diagram representation of a secure memory device connected to a secure memory socket in a manner that allows program memory content contained within the secure memory device to be protected from unauthorized reading, in accordance with one embodiment of the present invention.

FIG. 26 is a block diagram representation of a secure memory device connected to a secure memory socket in a manner that allows program memory content contained within said secure memory device to be protected from unauthorized reading, in accordance with one embodiment of the present invention.

Figure 27:
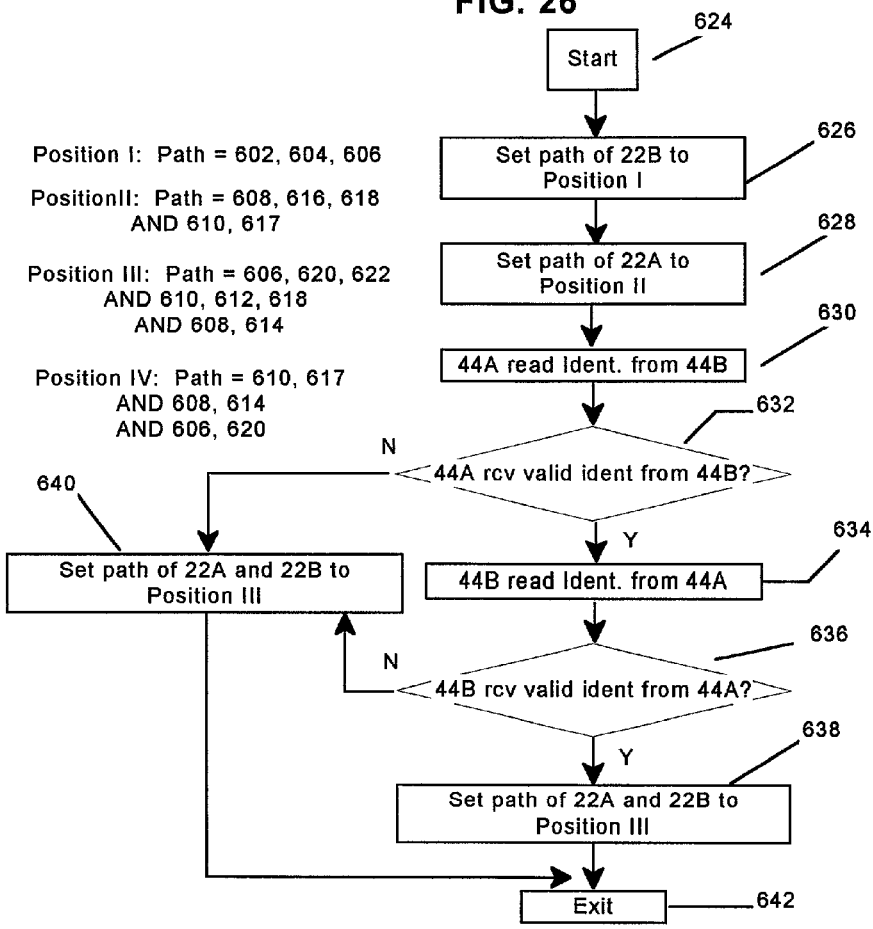
FIG. 27 is a flowchart for the connection scheme of FIG. 26, in accordance with one embodiment of the present invention.

FIG. 27 is a flowchart for the connection scheme described below with reference to FIG. 26, in accordance with one embodiment of the present invention.

22A represents a secure memory device that may contain a program to be run upon a microcomputer. 22B represents a secure memory socket that is firmly fixed into a circuit board upon which said microcomputer is mounted and which accesses a program contained within 22A for its operation. Communication between the secure memory device and the secure memory socket may be by means of 52 and 53 of FIG. 2 or may be by means of circuit connections as shown in FIG. 26. Only a single contact pin of a secure memory device and secure memory socket is shown for purposes of illustration. 52 and 53 provide a remote means of communication between devices while the method shown in FIG. 26 provides hard-wired electrical connections that are less costly to implement. Though electrical connections in FIG. 26 are shown to connect electrical signals by means of existing data and address bus connections, said electrical signals may also be connected by means of a separate set of connections.

Turning now to the operation of the circuit; normal operation in which program memory may be accessed by a computer or microcomputer requires that program memory 30 be connected to 612 and then to 618, which may be accomplished by programmable electrical path 610. Electrical path is 610, 612, 618. Aforesaid connection is as previously described for operational connection of a secure memory device. Microcomputer 44A included upon the secure memory device is disconnected from the circuit by means of its programmable memory path 608 being placed in contact with 614 which is a high impedance contact.

Secure memory socket 22B is connected for normal operation to allow access of program memory by connection of socket member 606 to pin contact 620 by means of programmable electrical path 604. 622 represents a pin connection of an integrated circuit socket that makes connection with a printed circuit board that includes a microcontroller or computer which depends upon program memory contained in said socket for its operation. Electrical path is 606, 604, 620, 622. This is as described previously for operational connection of a secure memory socket.

Individual program memory verification is performed by secure memory device 22A connecting program memory 30 to microcomputer 44A by means of electrical path comprised of 610, 616, 608. Program memory content can be verified by means of a method already presented earlier. Program memory content can also be verified by secure memory socket 22B connecting microprocessor 44B to read the secure memory device 22A inserted into said secure memory socket by means of electrical path 602, 604, 606. Method of verification has been presented earlier.

If secure memory device 22A has programmable electrical paths set to position 610, 617 and microprocessor 44A has its programmable electrical path set to 608, 616 a direct electrical path from 44A to secure memory device pin 618 results by means of 608, 616, 618. If secure memory socket 22B has programmable electrical path from microprocessor 44B set to 602, 604, 606 a direct electrical path exists between microprocessor 44B and microprocessor 44A. Said direct electrical path existing between 44A and 44B provides an electrical communication link for exchange of unique identification between the secure memory device 22A and the secure memory socket 22B. Said unique identification information may be stored by 44A and 44B. 44A stores information concerning 44B and vice versa. Upon application of power to secure memory device 22A, microprocessor 44A, performs an internal check of validity of program memory contents contained in 30. The method of performing this was explained earlier. 44A then sets the programmable electrical path to 608, 616, 618 and attempts to read a previously stored unique identification from secure memory socket 22B. If the secure memory device cannot read and verify a unique electronic identification as previously stored, program memory programmable electrical path is set to 610, 617 and the program memory is electrically disconnected from pins of the secure memory device. This prevents access to program memory and said program memory cannot be read. Said action effectively prevents copy of program memory contents and/or use of program memory until such time as the secure memory device is erased or inserted into the exact secure memory socket with which it has exchanged electronic identification. A flowchart representation of the process just described is shown in FIG. 27, which includes steps 624, 626, 628, 630, 632, 634, 636, 638, 640 and 642.

A preferred embodiment of the secure memory device described here is the same as given previously, but with the code of the CPLD or FPGA device changed to realize the extra connection point which allows 44A and 44B to connect directly to each other. If 52 and 53 of both the secure memory device and secure memory socket are used for communication between the two devices, no change to hardware is required. A change to program flow is shown in FIG. 5A at 96 where a location in microprocessor memory called PrgFlag3 is cleared. PrgFlag3 is used to indicate to the program that a new program has been written into program memory and that program memory has not been installed into a circuit board and power has not been applied for the first time. When power is applied to the secure memory device for the first time, PrgFlag3 is set and an identity of a secure memory socket is read and stored. The secure memory device will not operate with another secure memory socket or with another memory socket until PrgFlag3 is cleared by means of an external command which may be given by a remote access device.

Figure 28:
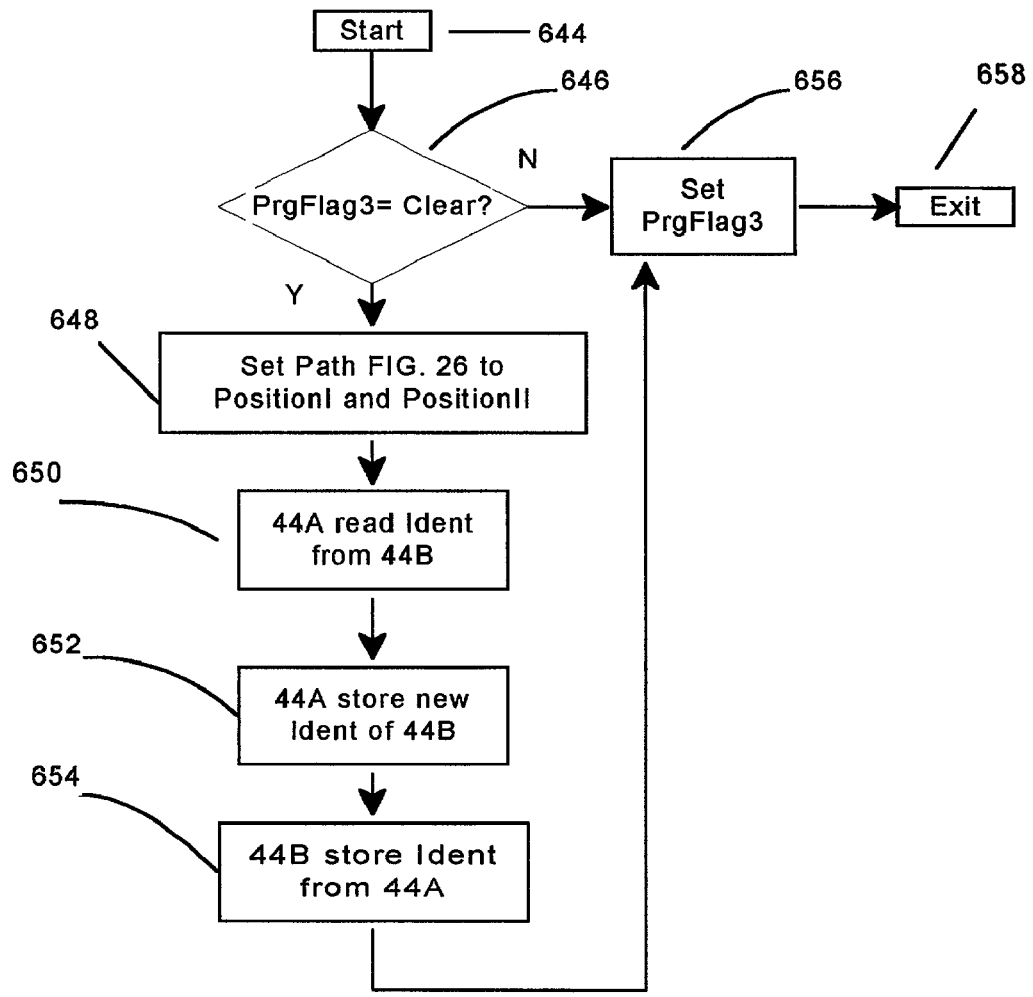
FIG. 28 is a flowchart representation of a program which may be running upon microprocessors of FIG. 26, in accordance with one embodiment of the present invention.

FIG. 28 which is a flowchart representation of a program which may be running upon 44A and 44B of FIG. 26, in accordance with one embodiment of the present invention. Said program begins at 644 where microprocessor registers are initialized and continues to 646 where a check is made for logic state of a location in program memory, PrgFlag3. PrgFlag3 is cleared at 96 when a program content is written into a secure memory device. If PrgFlag3 is not clear, it is changed to a logic state of set at 656, the program continues to 658 where it exits. If PrgFlag3 is clear at 646, program continues to 648 where electrical connections in both the secure memory device and secure memory socket are set to a state to allow communication between 44A and 44B. Program continues to 650 where microprocessor 44A reads an electronic identification of microprocessor 44B, which is included upon the secure memory socket, continues on to 652 and stores in nonvolatile memory in 44A the electronic identification of 44B. Program continues to 654 where a command is issued to 44B to read and store the electronic identification of 44A. Program then continues on to 656. The program segment just described provides means for the secure memory device and secure memory socket to lock to each other and to provide means by which program memory content stored in the secure memory device can not be read unless mated to a unique secure memory socket.

Practical Implementation of System and Method

In a preferred embodiment, remote monitor unit 24 may comprise a transceiver 63 of type TR1000 manufactured by RF Devices, a voltage level shifting integrated circuit 62 of type LTC1755 manufactured by Linear Technology, a microprocessor 55 of type SAFC505CLM manufactured by Siemens Electronics, a program memory 54 of type AM27C512 manufactured by AMD, a nonvolatile RAM 59 of type STK12C68 manufactured by Simtek, and a machine control interface 61 which may be any well known relay or device appropriate to interface to a signaling device or of a capacity to interrupt electrical power to a gaming apparatus to which said fixed device is attached. System data bus 66 may be of the well-known type known as a Controller Area Network. Electrical power to said remote monitor unit may be supplied by means of a power supply deriving energy from an AC mains supply to a gaming apparatus or may be supplied by means of a battery. The remote monitor unit may be attached firmly and permanently to an enclosure of an apparatus which includes a secure memory socket or secure memory device and may be affixed in such manner that any tampering with attachment of the remote monitor unit or opening of an enclosure housing the remote monitor unit is readily evident.

A secure memory device 22 may comprise a transceiver 52 of type TR1000 manufactured by RF Devices, a voltage level shifting integrated circuit 48 of type LTC1755 manufactured by Linear Technology, a microcontroller 44 of type PIC16C74manufactured by Microchip, a NAND gate of type SN74AC1G00manufactured by Texas Instruments and connected as an inverter 45, an analog switch 33 of type 74ACQ245 manufactured by Pericom, and analog switch 38 of type PI5C32X245 and PI5C3245 manufactured by Pericom. Pins to memory socket 31 may be of a type manufactured by Samtec, Molex or AMP and may be mounted into a circuit board; material of which is composed of a type commonly known as FR4. Nonvolatile memory 30 may be of type AT29C020 manufactured by ATMEL.

Communication with a secure memory socket, secure memory device or a remote monitor unit may be by means of any well-known data-gathering device operating upon a radio frequency compatible with transceivers of type TR1000 included.

A remote access device 19 may comprise a microcontroller 480 of type DS87C530 manufactured by Dallas Semiconductor; said microcontroller includes program memory 482 and data memory 481. Said remote access device may also comprise a transceiver 484 of type TR1000 manufactured by RF Devices and antenna 486 of type LDA82 manufactured by Murata. Additionally a battery 485 of type TL-2135 manufactured by Tadiran Electronics may be included as may command input output device 483 of type DS2480B manufactured by Dallas Semiconductor. Command input to the remote access device may be provided by DS1991 manufactured by Dallas Semiconductor.

FIG. 20 is a block diagram of a preferred embodiment of a secure memory socket, in accordance with one embodiment of the invention. Microcontroller, program memory and nonvolatile memory are included in 44 which may be of a type MSP430F1121IPW manufactured by Texas Instruments, transceiver 52 is of type TR1000 manufactured by RF Devices, all program memory switching functions 490 are included within a complex programmable logic device of type XCR5064 manufactured by Xilinx, program memory socket 30a is of type ICF-63X-T-O manufactured by Samtec, and electrical interconnect pins 30b are of type 350 series manufactured by Mill-Max. Aforesaid preferred embodiment comprises a secure memory socket. By substitution of an appropriate program memory such as SST27SF512 manufactured by Silicon Storage Technology in place of memory socket 30a and maintaining corresponding connection to electrical signals, a secure memory socket may be transformed into a secure memory device. Communication interface with a remote monitor unit or with a remote access device may be by means of 53 which may be a chip antenna of type LDA82 manufactured by Murata. Additionally, transceiver 52 may be replaced in the future with an integrated semiconductor device of the type well known as Bluetooth.

It should be noted that the preceding discussion discloses a method of computer memory protection and verification that can be applied to rotating storage and other solid-state memory devices as well as to the devices described herein.

A person skilled in the art will see that a secure memory socket and a secure memory device as described herein may be easily and economically constructed by means of several well-known electronic manufacturing processes. A remote monitor unit may be constructed by same said processes. Advances in semiconductor processes will allow totally semiconductor construction of the invention described herein by semiconductor foundry processes.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, independently computing a binary content signature of the program memory content during a first time period, independently computing a binary content verification of the program memory content during a second time period, comparing the binary content signature with the binary content verification, and determining whether the binary content signature is equivalent to the binary content verification, according to processes of the present invention.

It will be understood that what has been disclosed herein comprises a novel computer memory protection and verification system and method. Additionally, a method of constructing computer-controlled architecture in which program memory substitution can be easily detected has been described. Those having skill in the art to which the present invention pertains will now, as a result of the applicant's teaching herein, perceive various modifications and additions which may be made to the invention. All such modifications and additions are deemed to be within the scope of the invention.

What is claimed is:

1. A method of protecting a primary memory device, comprising the steps of:
    calculating a first signature of and from contents of the primary memory device comprising a verification of the contents of the primary memory device at a time the first signature is calculated;
    storing the calculated signature in a secondary memory device separate from the primary memory device;
    calculating a second signature of and from contents of the primary memory device comprising a verification of the primary memory device at a time the second signature is calculated;
    comparing the first signature to the second signature; and
    disconnecting the primary memory device from a control processor that operates based on instructions stored in the primary memory device if the first signature and the second signature do not match;
    wherein:
    the steps of calculating a first signature, storing, calculating a second signature, comparing, and disconnecting are performed independently of the control processor; and
    the secondary memory device is physically and operationally independent of the primary device.

2. The method according to claim 1, further comprising a step of maintaining stability of the control processor if the primary memory is disconnected from the control processor.

3. The method according to claim 2, wherein the step of maintaining stability of the control processor comprises placing a predetermined pattern on a data bus path to the control processor that prevents the control processor from behaving erratically.

4. The method according to claim 2, wherein the step of maintaining stability comprises placing a predefined pattern on a data bus path wherein the predetermined pattern causes the control processor to remain in a predetermined state.

5. The method according to claim 1, wherein a memory protection unit is configured to read the contents of the primary memory device as needed for calculation of the first and second signatures but operates independently of the primary memory device.

6. The method according to claim 1, wherein the primary memory device comprises a program memory in a consumer interactive device.

7. The method according to claim 6, wherein the consumer interactive device is a casino gaming apparatus.

8. The method according to claim 6, wherein the consumer interactive device is an Automatic Teller Machine (ATM) machine.

9. The method according to claim 6, wherein the consumer interactive device is a gaming machine and the method further comprising the step of communicating with a Remote Access Device (RAD) utilized to verify the memory contents by a floor agent according to gaming regulations.

10. The method according to claim 9, wherein the RAD includes commands usable by the floor agent to disable the gaming machine.

11. The method according to claim 10, wherein the RAD is a portable battery powered device.

12. The method according to claim 9, further comprising the step of communicating with the RAD via a bluetooth communication.

13. The method according to claim 6, wherein the consumer interactive device is a casino style gaming machine and the method further comprises a verification of the memory unit to a check device external to the casino style gaming machine.

14. The method according to claim 1, wherein the secondary memory device is not accessible by the control processor.

15. The method according to claim 1, wherein the secondary memory device module is only accessible by a microcontroller that is independent of the control processor.

16. The method according to claim 3, wherein the predetermined pattern comprises a non-op instruction.

17. The method according to claim 1, wherein the steps of calculating a first signature, storing, calculating a second signature, comparing, and disconnecting are performed by a microcontroller located in a memory socket in which the primary memory device is installed.

18. The method according to claim 1, wherein the first and second signatures are calculated from the entire contents of the primary memory device.

19. A method of protecting a primary memory device, comprising the steps of:
    calculating a first signature of and from contents of the primary memory device comprising a verification of the contents of the primary memory device at a time the first signature is calculated;
    storing the calculated signature in a secondary memory device separate from the primary memory device;
    calculating a second signature of and from contents of the primary memory device comprising a verification of the contents of the primary memory device at a time the second signature is calculated;
    comparing the first signature to the second signature;
    disconnecting the primary memory device from a control processor that operates based on instructions stored in the primary memory device if the first signature and the second signature do not match;
    wherein:
    the steps of calculating a first signature, storing, calculating a second signature, comparing, and disconnecting are performed by a memory protection unit that operates independently of the control processor;
    the secondary memory device is not accessible by the control processor and is physically independent of the primary memory device;
    the memory protection unit is configured to read the contents of the primary memory device as needed for calculation of the first and second signatures but operates independently of the primary memory device;
    the primary memory device comprises a program memory in a consumer interactive casino gaming device;
    the memory protection unit is further configured to communicate with a remote verification unit utilized to verify the memory contents by a floor agent according to gaming regulations;

the secondary memory device is only accessible by the memory protection unit;

the memory protection unit is located in a memory socket in which the primary memory device is installed; and the step of disconnecting comprises physically disconnecting the primary memory device from the control processor.

20. A method of protecting a program memory, comprising the steps of:

calculating a signature from contents of the program memory, the signature comprising a verification of the contents of the program memory;

comparing the calculated signature to a previous signature of contents of the program memory from a previously known state; and preventing a control processor from accessing the program memory if the calculated signature does not match the previous signature;

wherein:

the steps of calculating, comparing, and preventing are performed by a memory test device;

the memory test device is operationally independent of the control processor and the program memory but is capable of accessing the program memory contents;

the step of preventing comprises maintaining control processor stability by placing a predetermined pattern on a control bus to the control processor to prevent erratic behavior of the control processor; and the memory test unit comprises a unit that communicates wirelessly with a Remote Access Device (RAD) used to verify e status of the program memory.

21. The method according to claim 20, the Remote Access Device wireless unit is a bluetooth device.

22. The method according to claim 1, wherein the step of comparing is performed in a remote device.

23. The method according to claim 1, wherein at least one step of the method is performed in a remote device.

24. The method according to claim 1, wherein at least one step of the method is initiated in a remote device.

25. The method according to claim 1, wherein:

the primary memory device is part of a gaming apparatus; and the method is performed in conjunction with a remote monitoring unit.

* * * * *

UNITED STATES PATENT AND TRADEMARK OFFICE
CERTIFICATE OF CORRECTION

| | | |
|---|---|---|
| PATENT NO. | : 7,155,590 B2 | Page 1 of 1 |
| APPLICATION NO. | : 09/827008 | |
| DATED | : December 26, 2006 | |
| INVENTOR(S) | : Richard M. Mathis | |

It is certified that error appears in the above-identified patent and that said Letters Patent is hereby corrected as shown below:

On the Title Page item 62, above item (65), insert --Priority Data: U.S. Provisional Application No. 60/195,967, filed April 11, 2000--

Signed and Sealed this

Twenty-sixth Day of May, 2009

JOHN DOLL
*Acting Director of the United States Patent and Trademark Office*